(12) United States Patent
Dunn et al.

(10) Patent No.: US 9,286,281 B2
(45) Date of Patent: Mar. 15, 2016

(54) COMPUTER FORM ACTION ZONE SUMMARY SYSTEM AND METHOD

(75) Inventors: Cary Dunn, Santa Barbara, CA (US); Jonathan Siegel, Santa Barbara, CA (US); Daryl Bernstein, Santa Barbara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 12/908,840

(22) Filed: Oct. 20, 2010

(65) Prior Publication Data

US 2011/0093769 A1  Apr. 21, 2011

Related U.S. Application Data

(60) Provisional application No. 61/253,778, filed on Oct. 21, 2009.

(51) Int. Cl.
*G06F 17/24* (2006.01)
*G06Q 10/10* (2012.01)

(52) U.S. Cl.
CPC .............. *G06F 17/243* (2013.01); *G06Q 10/10* (2013.01)

(58) Field of Classification Search
CPC ................................................... G06F 17/243
USPC ......................................... 715/221, 224, 226
See application file for complete search history.

(56) References Cited

U.S. PATENT DOCUMENTS

| | | | |
|---|---|---|---|
| 6,848,048 B1 * | 1/2005 | Holmes .................... | G06F 21/64 713/162 |
| 7,234,103 B1 | 6/2007 | Regan | |
| 7,353,183 B1 | 4/2008 | Musso | |
| 7,934,098 B1 * | 4/2011 | Hahn ....................... | G06F 21/64 713/176 |
| 8,924,729 B1 * | 12/2014 | Oakes, III ............. | H04L 9/3247 713/176 |
| 8,949,708 B2 * | 2/2015 | Peterson ............... | G06F 21/645 715/234 |
| 2002/0029086 A1 | 3/2002 | Ogushi et al. | |
| 2003/0037062 A1 | 2/2003 | Nisler et al. | |
| 2004/0205526 A1 * | 10/2004 | Borodovski et al. ......... | 715/505 |
| 2004/0205533 A1 | 10/2004 | Lopata et al. | |
| 2004/0236694 A1 * | 11/2004 | Tattan ...................... | G06F 21/32 705/50 |
| 2005/0102520 A1 * | 5/2005 | Baxter .................... | G06F 21/64 713/176 |
| 2005/0177389 A1 * | 8/2005 | Rakowicz .......... | G06Q 20/3829 705/75 |
| 2005/0216742 A1 * | 9/2005 | Wong .................... | H04L 9/3247 713/176 |
| 2005/0262353 A1 * | 11/2005 | Gentry .................. | H04L 9/3281 713/176 |
| 2006/0161780 A1 * | 7/2006 | Berryman ............... | G06F 21/64 713/716 |

(Continued)

OTHER PUBLICATIONS

Wu, Yongdong. "Efficient authentication of electronic document workflow." In Information Security and Cryptology, pp. 101-112. Springer Berlin Heidelberg, 2005.*

*Primary Examiner* — Frank D Mills
(74) *Attorney, Agent, or Firm* — BainwoodHuang

(57) ABSTRACT

A system and method for facilitating the entry by a signer user of information into a scaffold electronic document having multiple information entry fields, over the internet or similar network. The system includes a document summary server, in communication with a document execution server, and associated with a scaffold electronic document via network. The document summary server facilitates the entry by a signer user of information into one or more information entry fields in a scaffold document.

19 Claims, 24 Drawing Sheets

(56) References Cited

U.S. PATENT DOCUMENTS

| | | |
|---|---|---|
| 2006/0218012 A1 | 9/2006 | Hernandez et al. |
| 2006/0224895 A1* | 10/2006 | Mayer ................. G06Q 20/389 |
| | | 713/176 |
| 2007/0022293 A1* | 1/2007 | Hayashi ................. G06F 21/64 |
| | | 713/176 |
| 2007/0168672 A1* | 7/2007 | Izu ....................... G06F 21/645 |
| | | 713/176 |
| 2008/0072334 A1* | 3/2008 | Bailey ................... G06Q 10/10 |
| | | 726/28 |
| 2008/0209313 A1* | 8/2008 | Gonser ......................... 715/255 |
| 2008/0215976 A1 | 9/2008 | Bierner et al. |
| 2009/0024912 A1* | 1/2009 | McCabe ................ G06Q 10/10 |
| | | 715/224 |
| 2009/0077386 A1* | 3/2009 | Simonian .............. H04L 9/3231 |
| | | 713/176 |
| 2009/0141952 A1* | 6/2009 | Saito ..................... G06F 21/645 |
| | | 382/124 |
| 2009/0249191 A1* | 10/2009 | Leoutsarakos ......... G06Q 10/10 |
| | | 715/234 |
| 2010/0106973 A1* | 4/2010 | Guenther .............. H04L 9/3281 |
| | | 713/176 |
| 2010/0169651 A1* | 7/2010 | Scheidt ................. H04L 9/3231 |
| | | 713/176 |
| 2011/0179289 A1* | 7/2011 | Guenther ................ G06F 21/32 |
| | | 713/189 |

* cited by examiner

COMPUTER FORM ACTION ZONE SUMMARY SYSTEM AND METHOD

REFERENCE TO RELATED APPLICATIONS

This application claims priority to U.S. Provisional patent application Ser. No. 61/253,778, filed Oct. 21, 2009, entitled, "Improved Systems and Methods for Document Signing." This application is related to the following U.S. patent applications: U.S. Ser. No. 12/908,827 entitled "Document Signing Systems and Methods", filed Oct. 20, 2010, and U.S. Ser. No. 12/908,847 entitled "Form Completion Rate Enhancement System and Method", filed Oct. 20, 2010. All such applications are incorporated fully herein by reference.

FIELD

The present system and method relates to systems and methods for enabling users to execute electronic documents which have multiple information entry fields, requiring entry of multiple various types of information, for multiple users.

BACKGROUND

Businesses and individuals rely on legally executed documents in a variety of contexts, from completion of complex forms used by governments and institutions (e.g., insurance forms, car loan and purchase forms, and the like), to simple contracts between individuals (e.g., lease agreements, wills, and a host of miscellaneous arrangements), with a range of contracts in between.

Documents signed by overnight envelope take a minimum of one day to reach the recipient and an additional day to be returned. Due to intra-office distribution delays and recipients' tendency to put paper documents in to-do piles, the average cycle time using overnight envelopes is 5-7 days. Documents signed by fax have an average cycle time of 2-3 days, due to intra-office delays, procrastination of paper document tasks, and fax machine mishaps. Faced with the burden of signing a paper document and returning it by fax, scan, or mail, many recipients put it down on their desk and forget about it.

While simply typing the signer's name fulfills the legal requirement for an online agreement, users find a "real" signature more assuring, and often third parties only accept documents signed by what appears to be a "real" signature, i.e., one that looks as though an individual put pen-to-paper to apply a personal signature. For online document signing, the presence of a handmade mark provides an extra level of authentication.

For complex forms, there often are several fields within the form that require a signer to either initial, complete information (e.g., name, address, and other personal information), and sign. It also is possible that a single form or document may require action by more than one signer. For example, in an insurance claim form, it is possible that the claimant may be required to complete information in some fields of the document, while the claim adjuster must complete other fields in the same document. Ensuring that all of the multiple fields are not only completed, but completed with the correct type of information, usually involves multiple iterations, erroneous submissions, and customer support. This causes delay in the transaction and increased cost for providing customer support. One advantage of providing documents for online signature is to expedite the signing event and reduce company overhead in obtaining complete documents for processing. Thus, there remains a need for a system and method for enabling a document creator to effectively electronically obtain execution of complex documents, having multiple information fields potentially requiring multiple and various types of information, to multiple signers.

SUMMARY

The present system and method are directed to facilitating the entry by a signer user of information into a scaffold electronic document having multiple information entry fields, over the internet or similar network. The scaffold electronic document includes content displayable to a user as text and/or graphics on one or more pages, and m groups of information entry fields $U_1, \ldots, U_i, \ldots, U_m$, each group being associated with a distinct user, and wherein the $i^{th}$ group of information entry fields includes $n_i$ information entry fields $F_{i1}, \ldots, F_{iji}, \ldots, F_{ini}$. As used herein, an information entry field of a group can be an initialing block, a signature block, or other information block all associated with a distinct user. The information entry fields associated with the $i^{th}$ user are adapted to receive information entered therein by the $i^{th}$ user.

In an embodiment, for a scaffold electronic document, a document summary server establishes a group index i for each of the m groups of information entry fields where $1 \leq i \leq m$, and establishes a subgroup index $j_i$ for the $i^{th}$ group of information entry fields $u_i$ of the respective m groups, where $1 \leq i \leq m$ and where $1 \leq j_i \leq n_i$, wherein i and $j_i$ for the $i^{th}$ user have initial values equal to 1 for the scaffold electronic document, and i and j, have maximum values equal to m and $n_i$ respectively for the scaffold electronic document. The document summary server makes available over a network for display to the user, the scaffold electronic document, in response to receipt over the network of data indicative of entry by the $i^{th}$ user of information into the $i_i^{th}$ information entry field of the $i^{th}$ group. The scaffold electronic document is modified to include the entered information in the $i_i^{th}$ information entry field, and the subgroup index j for the $F_{iji}^{th}$ subgroup is incremented.

The document summary server makes available for display in relation to the $i^{th}$ user, a steps-to-go display representative of the difference between the maximum value of the subgroup index $j_i$ for the $i^{th}$ user and the current value of the subgroup index $j_i$ for the $i^{th}$ user. The network may be a local network, the Internet, or other available network technology.

In an embodiment, the steps-to-go display is made available for display to the $i^{th}$ user. The steps-to-go display may be made available for display to the $i^{th}$ user in the form of a gauge showing the initial value of index $j_i$ (=1) for the $i^{th}$ user, the maximum value of the index $j_i$ (=$n_i$) for the $i^{th}$ user and the current value of the index $j_i$ (=$j_i$) for the $i^{th}$ user.

In another embodiment, the document summary server makes available for display in relation to the $i^{th}$ user, a next-field display representative of the location in the scaffold electronic document of the next information entry field in the $i^{th}$ group in the scaffold electronic document having no user-entered data. Alternatively, the next field display is made available for display to the $i^{th}$ user.

In an alternative method for facilitating the entry by a user, a document summary server for the scaffold electronic document, establishes a group index i for each of the m groups of information entry fields where $1 \leq i \leq m$, and establishes a subgroup index $j_i$ for the $i^{th}$ group of information entry fields $F_{iji}$ of the respective m groups, where $1 \leq i \leq m$ and where $1 \leq j_i \leq n_i$, wherein i and j, for the $i^{th}$ user have initial values equal to 1 for the scaffold electronic document, and i and j, have maximum values equal to m and $n_i$ respectively for the scaffold electronic document. The server makes available over a network (e.g., the internet or other available network) for display to the user, the scaffold electronic document and, in response to receipt over the network of data indicative of entry by the $i^{th}$ user of information into the $i_i^{th}$ information entry field of the $i^{th}$ group, modifies the scaffold electronic document to include the entered information in the $i_i^{th}$ information entry field, and increments the subgroup index $i_i$ for the $u_1^{th}$ subgroup. The server makes available for display in relation to the $i^{th}$ user, a progress display representative of the current value of the subgroup index j, for the $i^{th}$ user. In an embodiment, the progress display is made available for display to the $i^{th}$ user.

In an alternative embodiment, the document summary server makes available for display in relation to the $i^{th}$ user, a next-field display representative of the location in the scaffold electronic document of the next information entry field in the $i^{th}$ group in the scaffold electronic document having no user-entered data. In an embodiment, the next field display is made available for display to the $i^{th}$ user.

In yet another embodiment, a document summary server for the scaffold electronic document, establishes a group index i for each of the m groups of information entry fields where $1 \leq i \leq m$, and establishes a subgroup index $j_i$ for the $i^{th}$ group of information entry fields $F_{iji}$ of the respective m groups, where $1 \leq i \leq m$ and where $1 \leq j_i \leq n_i$, wherein i and $j_i$ for the $i^{th}$ user have initial values equal to 1 for the scaffold electronic document, and i and $j_i$ have maximum values equal to m and $n_i$ respectively for the scaffold electronic document. The server makes available over a network (e.g., the internet or other available network) for display to the user, the scaffold electronic document. In response to receipt over the network of data indicative of entry by the $i^{th}$ user of information into the $j_i^{th}$ information entry field of the $i^{th}$ group, the document summary server modifies the scaffold electronic document to include the entered information in the $j_i^{th}$ information entry field, and increments the subgroup index j for the $I_{iji}^{th}$ subgroup. A scope display representative of the maximum value of the subgroup index $j_i$ for the $i^{th}$ user is made available for display in relation to the $i^{th}$ user. In an embodiment, the scope display is made available for display to the $i^{th}$ user.

In an alternate embodiment, the document summary server makes available for display in relation to the $i^{th}$ user, a next-field display representative of the location in the scaffold electronic document of the next information entry field in the $i^{th}$ group in the scaffold electronic document having no user-entered data. In an embodiment, the next field display is made available for display to the $i^{th}$ user.

BRIEF DESCRIPTION OF FIGURES

FIGS. 9A-9M are screenshots of a computer performing the method.

DETAILED DESCRIPTION

Generally, the present system and method are directed to facilitating the entry by a user of information into a scaffold electronic document having multiple information entry fields over the internet or similar network. In some cases, the information entered is representative of a user's signature, so that entry of that information affects a signing of a previously unsigned electronic document.

Figure 1:
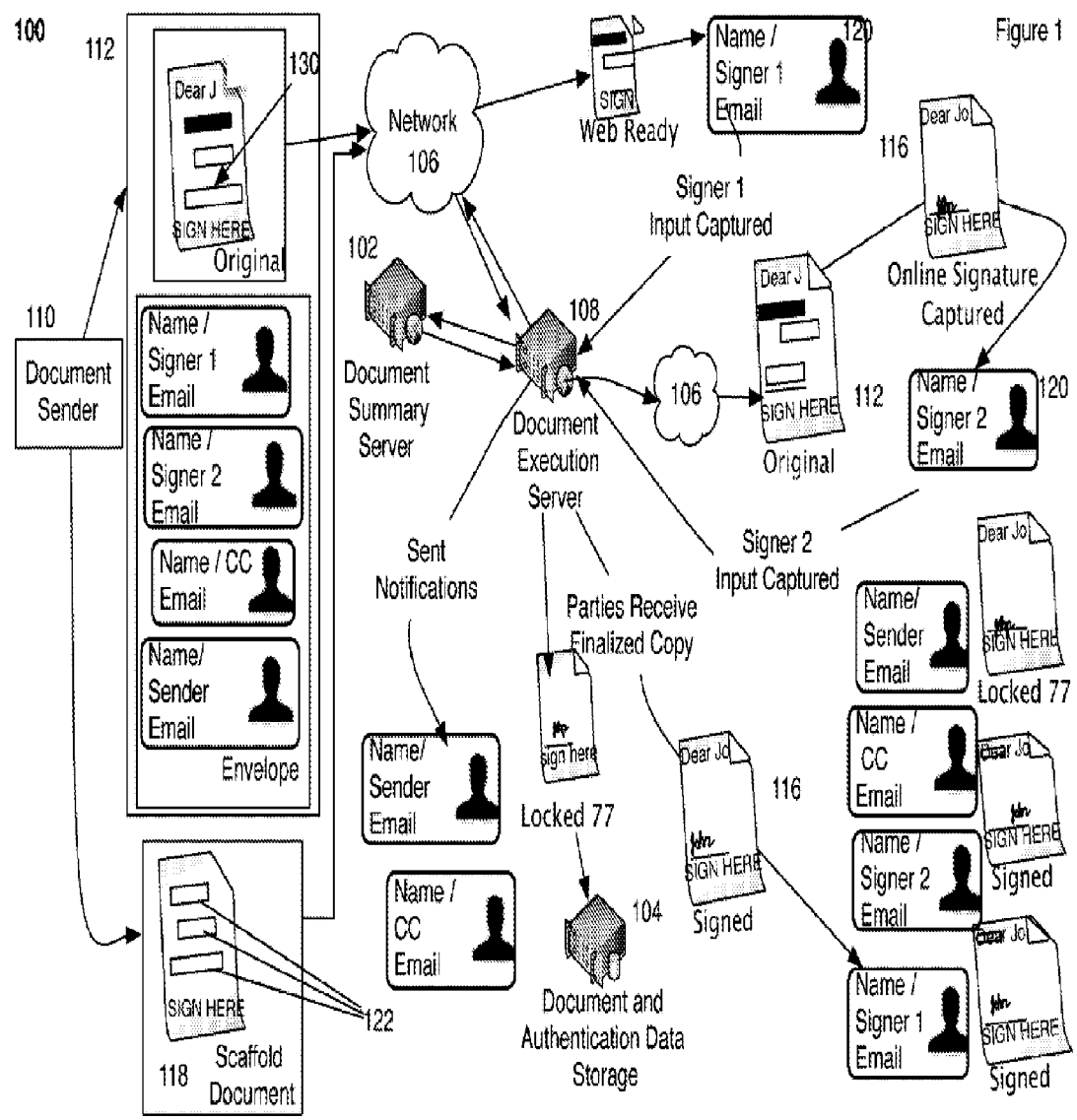
FIG. 1 shows a system chart of an embodiment of the present system.

As shown in FIG. 1, with respect to the signing of an unsigned electronic document, the present system 100 includes a document execution server (DES) 102 in communication with a document and authentication data storage device 104. The document execution server 102 is configured to receive over a network 106 from a document sender 110 an unsigned electronic document 112 that contains one or more signature fields 130, and data representative of the identities of signer users (who are to sign the electronic document) and parties to be copied.

As further shown in FIG. 1, the present system 100 includes a document summary server 108, in communication with the document execution server 102, and associated with a scaffold electronic document 118 via network 106, described in further detail below. The document summary server 108 facilitates the entry by a signer user 120 of information into one or more information entry fields 122 in a scaffold document 118.

Returning now to the document execution server 102, that server sends the unsigned electronic document 112 to one or more signer users 120, identified by the document sender 110. Once each target signer user 120 completes all designated signature fields for that signer user, the document execution server 102 converts the original unsigned electronic document 112 into a (partially) signed electronic document 116. Once all target signer users 120 have completed all designated signature fields, the input is combined to generate a signed electronic document 116. The signed electronic document 116 may be logged and stored in the document and authentication data storage device 104 for future use of the target document signed electronic document is made available to each of the signer users and the copied parties.

The document execution server 102 may send notifications to the document sender as well as user signers, indicating the progress of the signing activity. For example, the notifications may identify fields in the electronic document still requiring entry of data by one or more of the signer users.

Figure 2:
FIG. 2 is a screen shot of an unsigned electronic document as used in an embodiment of the present system and method.

FIG. 2 shows an example of an unsigned electronic document 112, having multiple signature fields 130. The unsigned electronic document 112 includes content displayable to a signer user 120 as text, graphics, or a combination of text and graphics. The unsigned electronic document 112 includes one or more signature fields 130, into which data is entered by signer users 120 at one or more locations on the pages of the electronic document 112 using online signature entry pads 132 associated with each signature entry field 130, as described in further detail below. The location, type, and number of signature fields 130 per document are specified by the document sender 110 to the document execution server 102. The document execution server 102 associates the signature fields 130 identified by the document sender 110, and presents the unsigned electronic document 112, including all signature fields 130, to the respective signer users 120 identified by the document sender 110. At the right side of FIG. 2, the progress in signing (or otherwise completing the signature fields for a signer user) are indicated by an information summary indicator 124, which is shown in this FIG. 2 as a "thermometer-type" graphic. In FIG. 2, the electronic document 112 is shown for a Chief Executive Officer signer user, displaying a signature field 130.

In an alternative embodiment, the document execution server 102 converts the original unsigned electronic document 112 into an unsigned web-ready document 114, having the same information and signature fields 130 as the original document. Unsigned web-ready documents are ready for dynamic entry of information into the signature fields 130 by one or more signer users 120. This web-ready conversion of the original documents may be achieved using standard conversion software and algorithms readily available and known to those skilled in the relevant art. For example, a Microsoft Word Document can be opened in the OpenOffice Application, exported as a PDF and then, using pdf2swf from SWF-TOOLS.org, exported in Flash format, which readily is displayable in most generally commercially available web browsers. In an alternative embodiment, the unsigned electronic document 112 is exported using similar tools into PNG files, which are supported by commercially available web browsers, and which technology is available in services such as DOCSTOC.com and SCRIBD.com.

After receiving the original unsigned electronic document 112 and, as applicable, converting the document to an unsigned web-ready document 114, the document execution server 102 makes available, via a network, either the original, unsigned electronic document 112 or the unsigned web-ready document 114 to a signer user 120, together with an online signature entry pad 132 associated with each signature field 130 in the unsigned electronic document 112. In an embodiment, the document execution server 102 makes the unsigned electronic document 112 available to multiple signer users 120, either simultaneously or serially, depending on instructions from the document sender 110, or other external, predetermined parameters and input. In an alternative embodiment, the document execution server 102 delivers the unsigned electronic document 112 via an application programming interface (API) for access by predetermined signer users.

Alternatively, also as shown in FIG. 1, the document summary server 108 may send a scaffold document 118 via email or other electronic transmission to one or more signer users 120. The same scaffold document 118 is made available to multiple signer users 120 either in a web ready format, via email, via a link through an API, or using other electronic means, as may be desirable for each signer user 120, as is the case with any unsigned electronic document.

Figure 3:
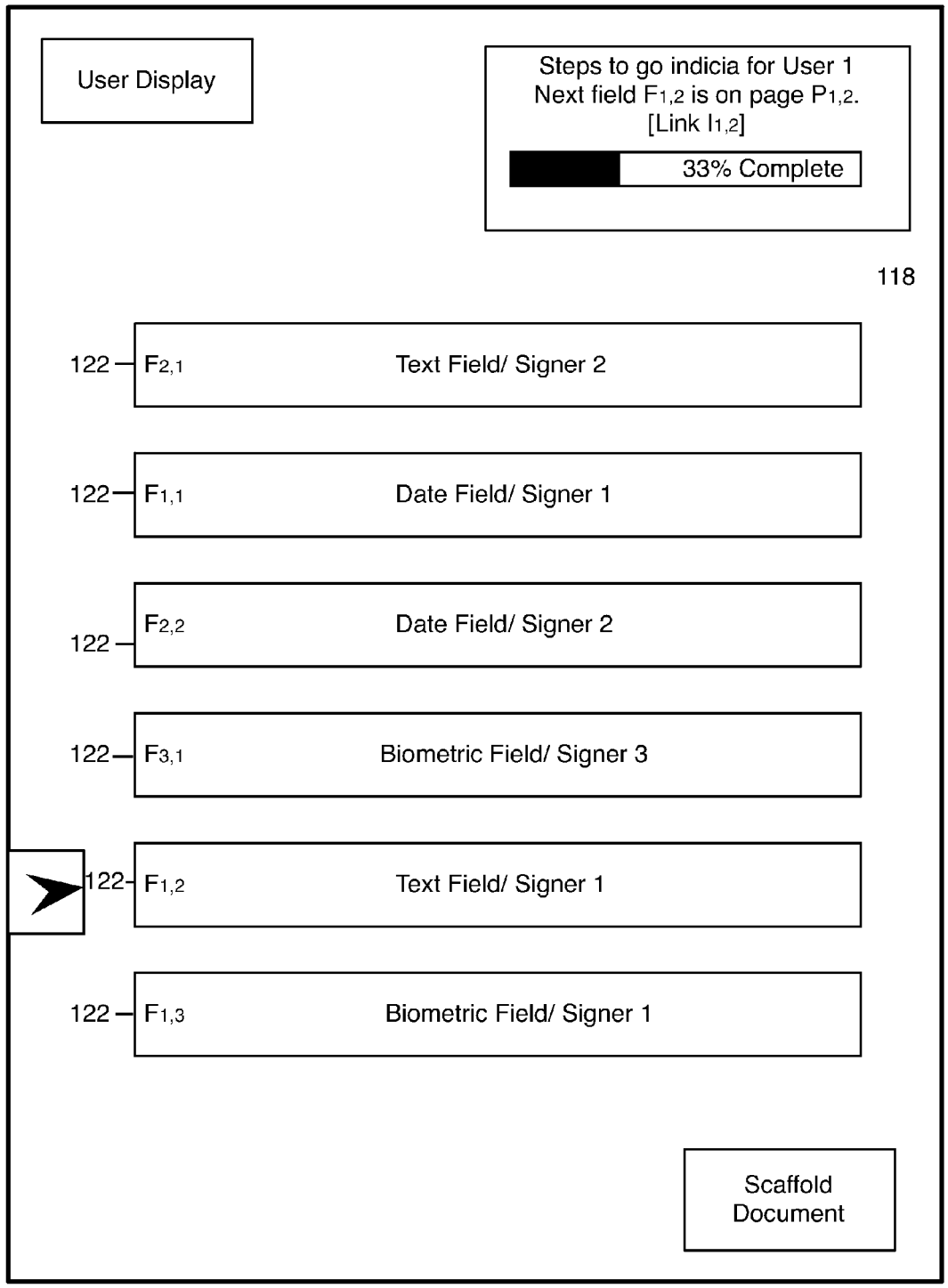
FIG. 3 is a screen shot of an unsigned electronic document as used in an embodiment of the present system and method.

FIG. 3 shows an embodiment of an electronic scaffold document 118 of the present system and method. As shown, the scaffold document 118 includes multiple and different fields F for the $i^{th}$ user $U_i$. In this illustrated embodiment, the document sender 110 designates a number of text fields, date fields, biometric fields, or others that are associated with each signer user 120. In the example, there are three signer users m=3. For the first signer user $U_1$, there are three fields to fill, n=3. Thus, $F_{2,1}$ corresponds to the first signature field 130 for the second signer user 120. Similarly, $F_{1,1}$ corresponds to the first signature field 130 for the first signer user 120, and so forth.

In response to receipt of the signature data from one or more of the signer users 120, the document execution server 102 generates a signed (or otherwise "filled-in" or completed) electronic document 116 corresponding to the unsigned electronic document 118 and including the signature data.

In an embodiment, the signed electronic document 116 then is made available by the document execution server 102 to all or a predetermined subset of the signer users 120 and to the document sender 110 for verification, confirmation, and other predetermined actions. In an embodiment, the document execution server 102 transmits the signed (or otherwise completed) electronic documents 117 (in a "locked" form) to a document and authentication data storage device 104.

As used herein, a signer user 120 may be the document sender or one or more third parties. In addition, the term "signature field", as used herein, includes entry fields for information or data that may include signatures, signer name, unique signer identifiers, signature initials, addresses, or any other information that a document sender may identify as being acceptable forms of information for a particular signature field. For example, in one real estate transaction document, one signature field type may require entry of the signer user's full, legal name, another signature field type may require entry of the target real property address, another signature field type may include date data, and such.

In addition, the term "signature" includes any biometric action by a signer user, such as: freehand motion using a mouse, electronic pen, touch-screen, or any other method for detecting and recording (either temporarily or in a stored location) graphics unique or capable of being associated with a particular signer user. It may also include iris or other eye scan data, fingerprints, vocal sound or voiceprints, or other available biometrics. The freehand motion may either approximate, electronically, the signer user's traditional signature (i.e., as performed with a pen or pencil on paper), or may be a graphic that is quite dissimilar from the signer user's traditional signature.

In an embodiment, the document summary server 108 establishes a group index i for each of the m groups of information entry fields F 108. For purposes of this document, we use the following definitions. With respect to signer users 130, m=number of users/groups of user fields, (e.g. the number of participant signer users), wherein 1<=i<=m. In addition, $U_i$ represents the $i^{th}$ signer user. In referencing signature field groups for a signer user, $F_i$ is the group of fields required to be "filled in" by the signer user $U_i$, i.e., for the $i^{th}$ signer user. $I_i$ is the number of incomplete (i.e., not "filled in") required fields for $U_i$. $C_i$ is the number of required fields completed by $U_i$. When a field $F_{i,j}$ is fully filled in, then $I_{i,j}$ becomes an empty entry which is ignored for counting purposes and skipped when iterating through elements. The same is true for $C_{i,j}$. Counts are represented as: $|F_i|$ is the total required field count for $U_i$; $|I_i|$ the incomplete required field count for $U_i$; and $|C_i|$ is the completed required field count for $U_i$, all at any given time.

Individual fields are represented as: $F_{i,j}$ is the field j for $U_i$; $P_{i,j}$ is the page number on which $I_{i,j}$ appears; $L_{i,j}$ is the actionable link to bring $F_{i,j}$ to the viewport (for example, if $F_{i,j}$ is offscreen to a signer user 120, clicking a link $L_{i,j}$, will bring $F_{i,j}$ into the middle of the user screen and make the field active for input by the sender user 120; and $Z_{i,j}$ is the visual indicator of next to be completed by the signer user. Thus, $1<=j<=|F_i|$.

Upon receiving a scaffold document 118, from a document sender 110, the document summary server 108 establishes a group index i for each of the m groups of information entry fields, where $1 \le i \le m$, and establishes a subgroup index $j_i$ for the $i^{th}$ group of information entry fields $I_{i,j,i}$ of the respective m groups, where $1 \le i \le m$ and where $1 \le j_i \le n_i$, wherein i and $j_i$ for the $i^{th}$ user have initial values equal to 1 for the scaffold electronic document, and i and $j_i$ have maximum values equal to m and $n_i$ respectively for the scaffold electronic document. The document summary server 108 makes available over the network 106, a version of the scaffold document 118 to one or more signer users 120. The scaffold document 118 is displayable to each signer user 120 to allow the signer user 120 to identify the information entry fields 122. As used herein, the term "information entry field" has the same meaning as "signature field"; however, for purposes of clarity, the term "information entry fields" is used in reference to scaffold documents, and the term "information entry fields" is used in reference to any unsigned electronic document.

Figure 4A:
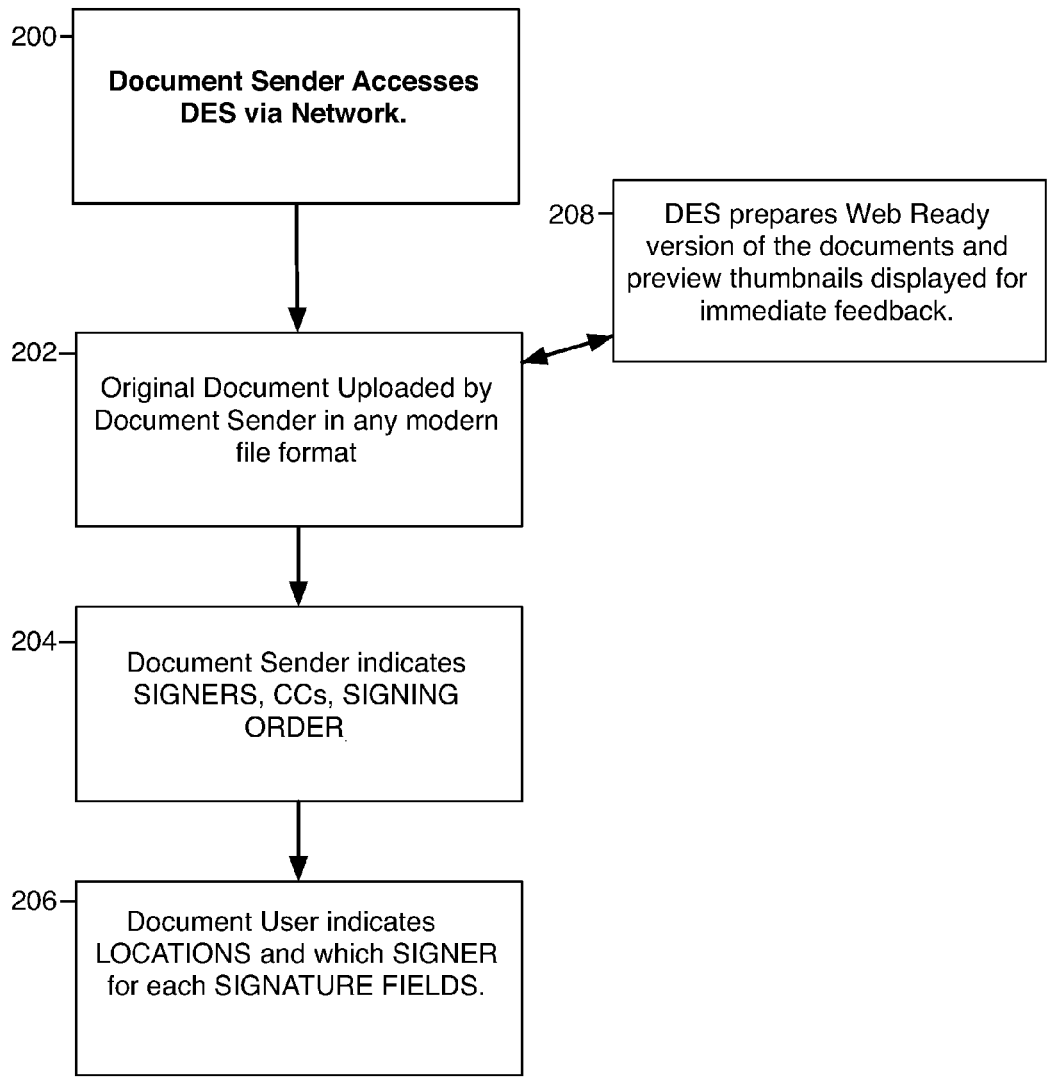
FIGS. 4A-4C are a flowchart of an embodiment of the present method.

The flowchart of FIG. 4A further illustrates an embodiment of the present method. As shown, a document sender accesses 200 the document execution server 102 via a network, such as the internet. The document sender then uploads 202 the original electronic document to the document execution server (DES). The document sender then indicates 204 the name and contact information of each signer user, each entity that will receive a copy of either the unsigned electronic document and/or the signed electronic document, and any order in which the signature fields contained in the subject document are to be completed by the designated signer users. The document sender also indicates 206 at this time, the locations of signature fields within the unsigned electronic document, together with instructions regarding which signer user is required to complete which corresponding signature field. With multiple signer users, different signer users generally are required to complete different signature fields, as well as different signature field types. For example, in a real estate transaction, the buyer may be required to provide a signature, a personal address, and a date, whereas an escrow agent may be required to provide a signature, a license number, and financial information.

As shown in FIG. 4A, in an embodiment, the document execution server prepares 208 a web-ready version of the original document. The document execution server also may generate thumbnail displays, flags, or other indicia, associated with the various signature fields for easier review by the signer user and a more expedient signer user completion of the designated signature fields.

Figure 4B:
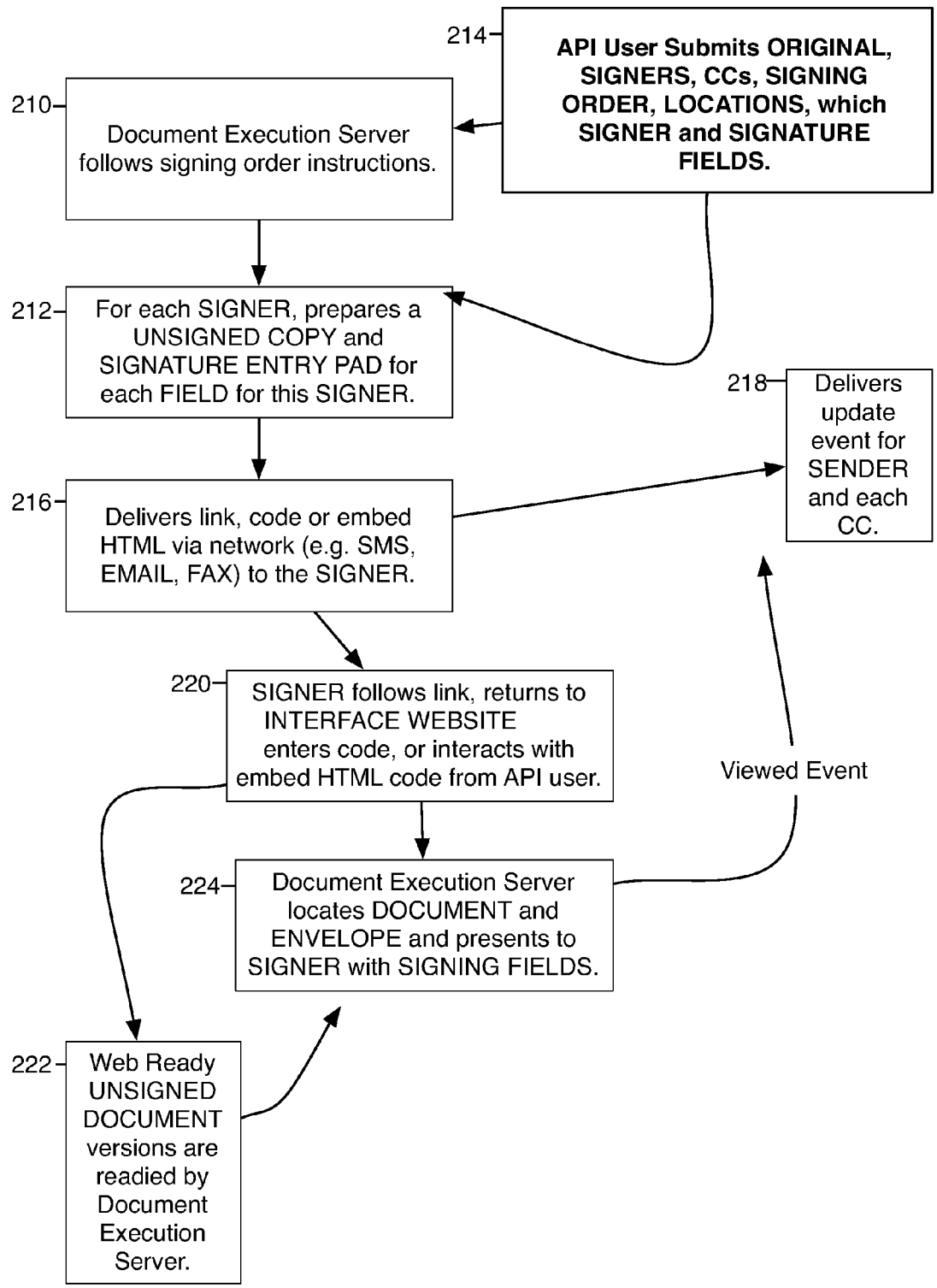

Turning to FIG. 4B, once the document execution server receives the original document, together with the additional document information from the document sender, the document execution server follows 210 the signing order instructions sent by the document sender. For each designated signer user, the document execution server in effect prepares 212 an unsigned electronic document associated with the original document, and a signature entry pad for each signature field. All such information regarding the signer user and instructions related to the document, are collectively referred to the "envelope" of the electronic document. Additional envelope information may include data associated with the identity of the signer user, such as email address, IP address, SMS address, facsimile number, or other electronic forms of address or identification. This envelope is integrally associated with the original document and, as such, remains part of the associated electronic and web-ready versions of the same document as such are generated by the document executive server.

In an alternative embodiment, an API user, such as another internet-based device, is the document sender, which submits 214 the original document, and the associated signer user, copied users, signing order, signature field locations, and signature field authorizations to the document execution server. In an embodiment, the API user receives delivery of the unsigned web-ready documents on behalf of the designated signer users.

Once the unsigned electronic document is prepared, the document execution server delivers 216 an internet link, code, or embedded HTML via a network to the designated signer users. The network includes SMS, email, facsimile, and other available technologies for distributing data. At a proximal time that the document execution server in effect transmits the unsigned electronic document to the signer users. The document execution server may deliver updates 218 of the event to the document sender and other designated entities to be copied on such transmission. In this manner, the document sender can begin to track the progress of the document as the designated signer users complete the signature events.

Once the link, code, embedded HTML, or other contact is made by the document execution server to a signer user, that signer user then accesses 220 the unsigned electronic document by following such link, returning to the website interface for the document execution server, interacts with the embedded HTML code from the API user, or otherwise opens the unsigned electronic document. The document execution server locates 224 the unsigned electronic document, together with its associated envelope information, and presents the same to each signer user.

Figure 4C:
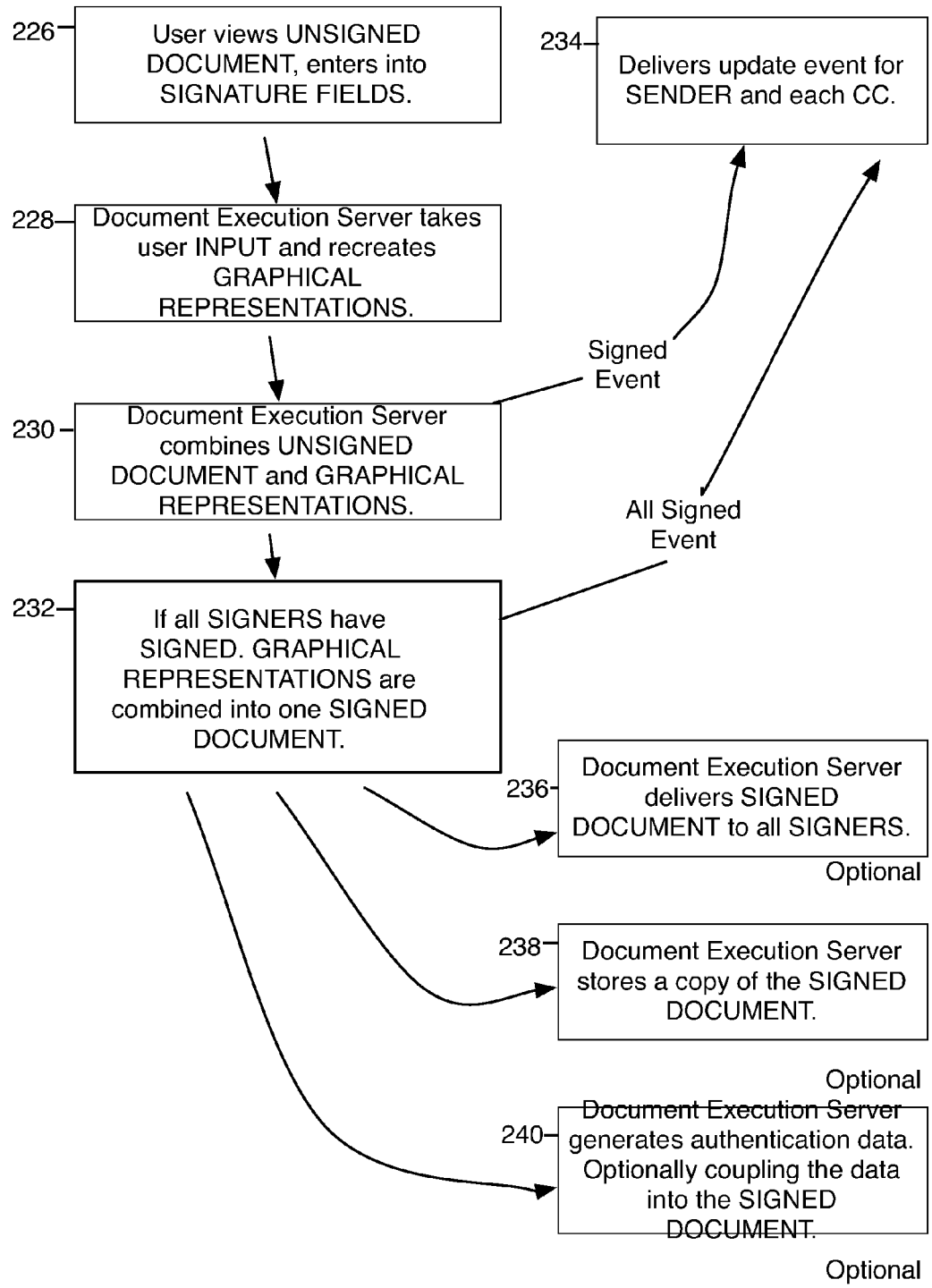

As continued in FIG. 4C, the signer user views 226 the unsigned electronic document, and enters the information requested in each of the signer user's respective signature fields. Information is entered into the signature field by the dynamic online signature entry pad associated with each signature field. Signature entry pads are dynamic fields that appear on the GUI to facilitate signer user entry of information required for the associated signature field. Such information may be entered using a touch pad, mouse, touch-screen, voice entry, and other technologies generally commercially available.

Upon receipt of the entered information, the document execution server creates 228 a graphical representation of the signature field input received from the signer user. The document execution server then (or at desired times) in effect combines 230 the graphical representations with the unsigned electronic document to generate a signed electronic document, to define a signed event. In parallel with receiving the signature field input from the signer users, and with generating each signed electronic document, the document execution server delivers 234 updates on the progress of the signing events to those entities identified as "cc", or copied entities, as well as to the document sender. Once all signers have completed signing the document, all graphical representations of all signature field input received from all signers is combined 232 into a single signed document.

In alternate embodiments, and as shown in FIG. 4C, the document execution server then delivers 236 a copy of the signed electronic document to each of the designated, or selected ones of the signer users associated with that document. In an embodiment, the document execution server optionally locks and stores 238 a copy of the signed electronic document, or may send a copy to a document and authentication data storage device for storage. In an embodiment, the document execution server generates 240 authentication data associated with the signed electronic document. Such authentication data may be data incorporated into the signed electronic document, it may be part of the document envelope, or may be some additional data used only for authentication purposes.

Figure 5:
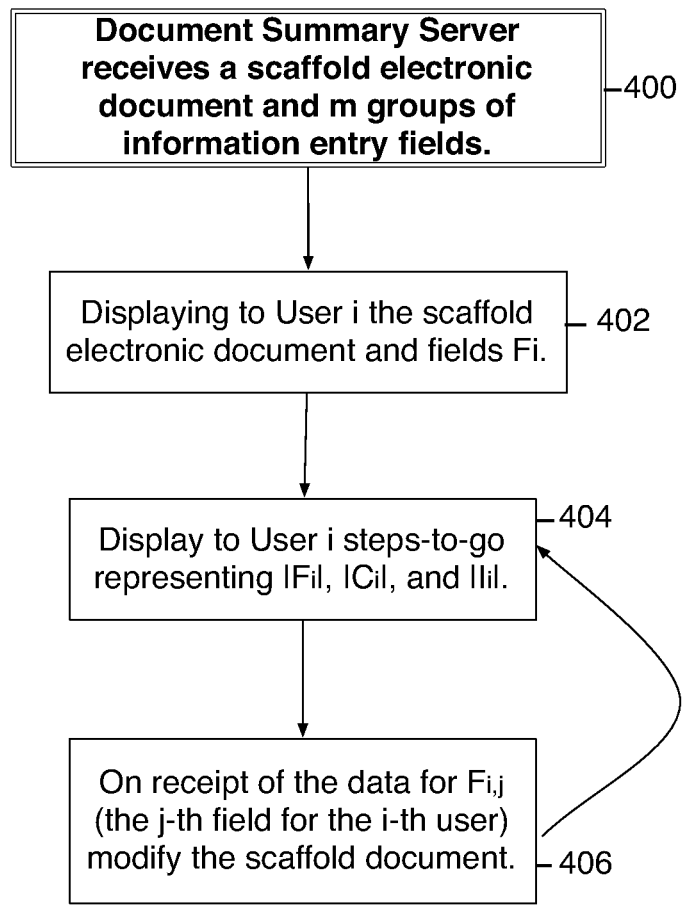
FIG. 5 is a flowchart of an embodiment of the present method.

In an alternative embodiment of the present method that includes a document summary server shown in FIG. 5, once the document summary server receives 400 a scaffold electronic document and m groups of information entry fields, the scaffold and fields $F_i$ then are displayed 402 to a user $U_i$. The display step includes displaying 404 a visual representation of steps-to-go, representing |F$_i$|, |C$_i$|, and |I$_i$|. Such visual representation may be permanent, dynamic representations, such as text, appearing at the top or side of the screens, or user-selective representations, such as text appearing in pull-down menus on the screen. Alternatively, such visual representations may be in the form of dynamic graphical displays, such as a "thermometer"-type graphic, a numerical, button, or other graphic countdown display, color displays, such as red "buttons" representing incomplete information entry fields and green "buttons" representing completed information entry fields. On receipt 406 of data for F$_{i,j}$ (i.e., the j$^{th}$ field for the i$^{th}$ user), the user receives an updated display 404, with the steps-to-go indicator iteratively adjusted to reflect the number of information entry fields remaining to be completed and/or the number of information entry fields completed.

Figure 6:
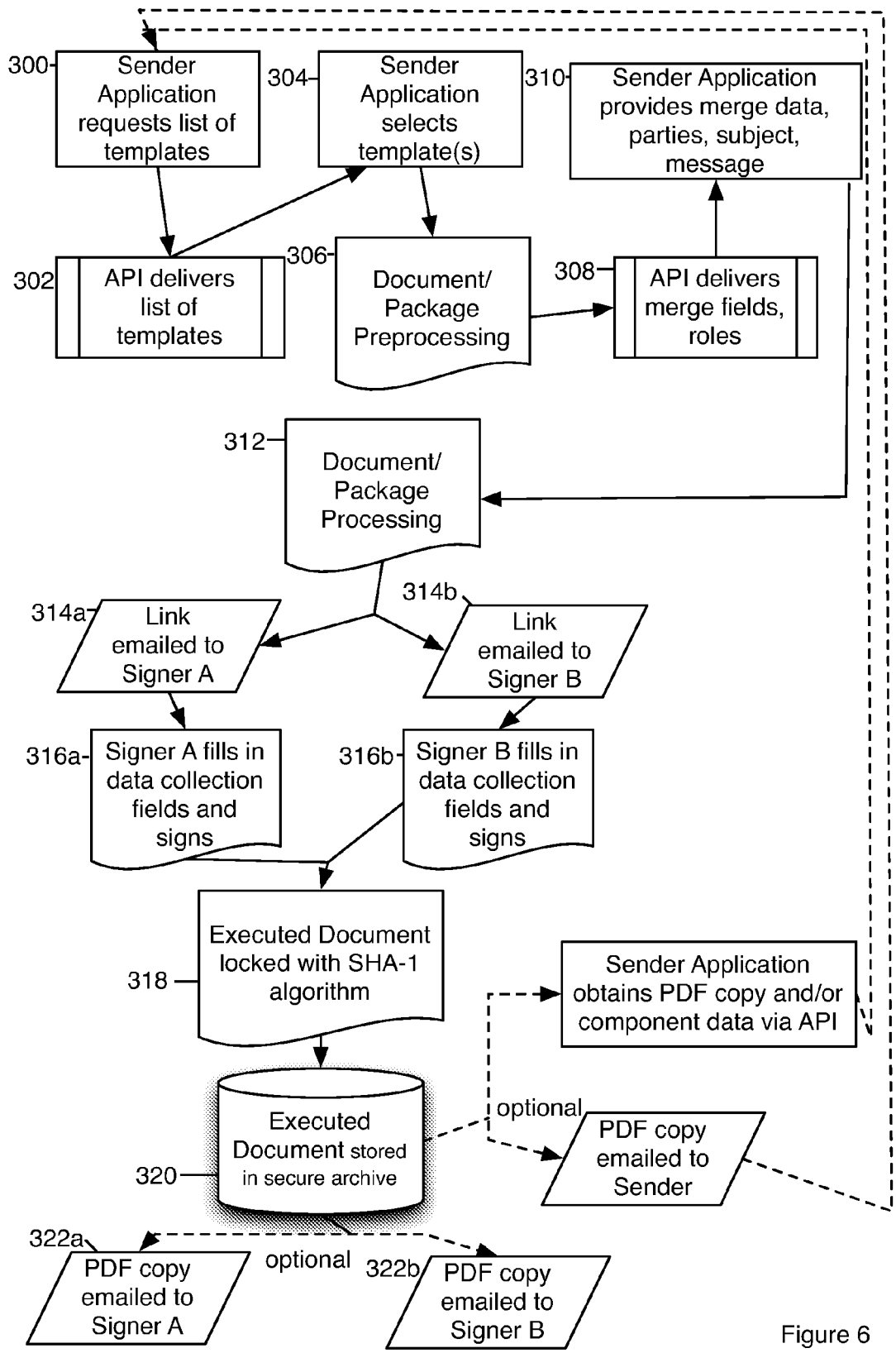
FIG. 6 is a flowchart of an embodiment of the present method.

In an alternative embodiment of the present method, predetermined template documents are created by third party entities, or the administrator of the present method, and stored in the document execution server for use by customer/document senders via API. In such an embodiment, as shown in FIG. 6, a document sender, or an application used by a document sender, requests 300 a list of template electronic documents. Such template documents have predetermined signature fields, which are not generally changed or changeable by the document sender. An example of such an embodiment would be form lease agreements, or other standard forms.

Upon receiving the request, the document execution server delivers 302 via API, a list of available templates to the sender user. The sender user application selects 304 a template. Upon receipt of the sender user template choice 304, the document execution server performs document package pre-process 306. This pre-process generates a document ID associated with the template. It is possible that many document ID's are associated with each template, and each unique document (having an assigned unique document ID) likely will have a unique envelope. The API then delivers 308 the merge fields and roles associated with the envelope for the designated template. The sender user application provides 310 merge data, information relating to the signer users, and other information and data required for the designated template. In this example, the template is the unsigned electronic document identified and discussed above. The document execution server processes 312 the unsigned template document, in a manner similar to that described above, and sends links 314a, 314b via email to each designated signer user. Each designated signer user provides 316a, 316b the information required for each signature field. Upon receipt of all signature field data, such data is incorporated into an unsigned template document, and the document execution server locks 318 the resulting signed electronic document. A lock includes any known software encryption algorithm, such as an SHA-1 algorithm.

At that point, the signed electronic document may be stored 320 in a document and authentication data storage device, and copies of the signed electronic document sent 322a, 322b to designated signer users, the document sender, and others as designated by the document sender.

In alternate embodiments, sender users select a template unsigned electronic document from a website, from the user's own library, or from secondary sources. Alternatively the step of processing the document 312 is followed by an API delivery of embedded signing codes. In an alternative embodiment, all communications between the document sender and the document execution server, or between the document execution server and one or more of the designated signer users, is via email, facsimile, SMS, and other electronic communications methods generally available.

Figure 7A:
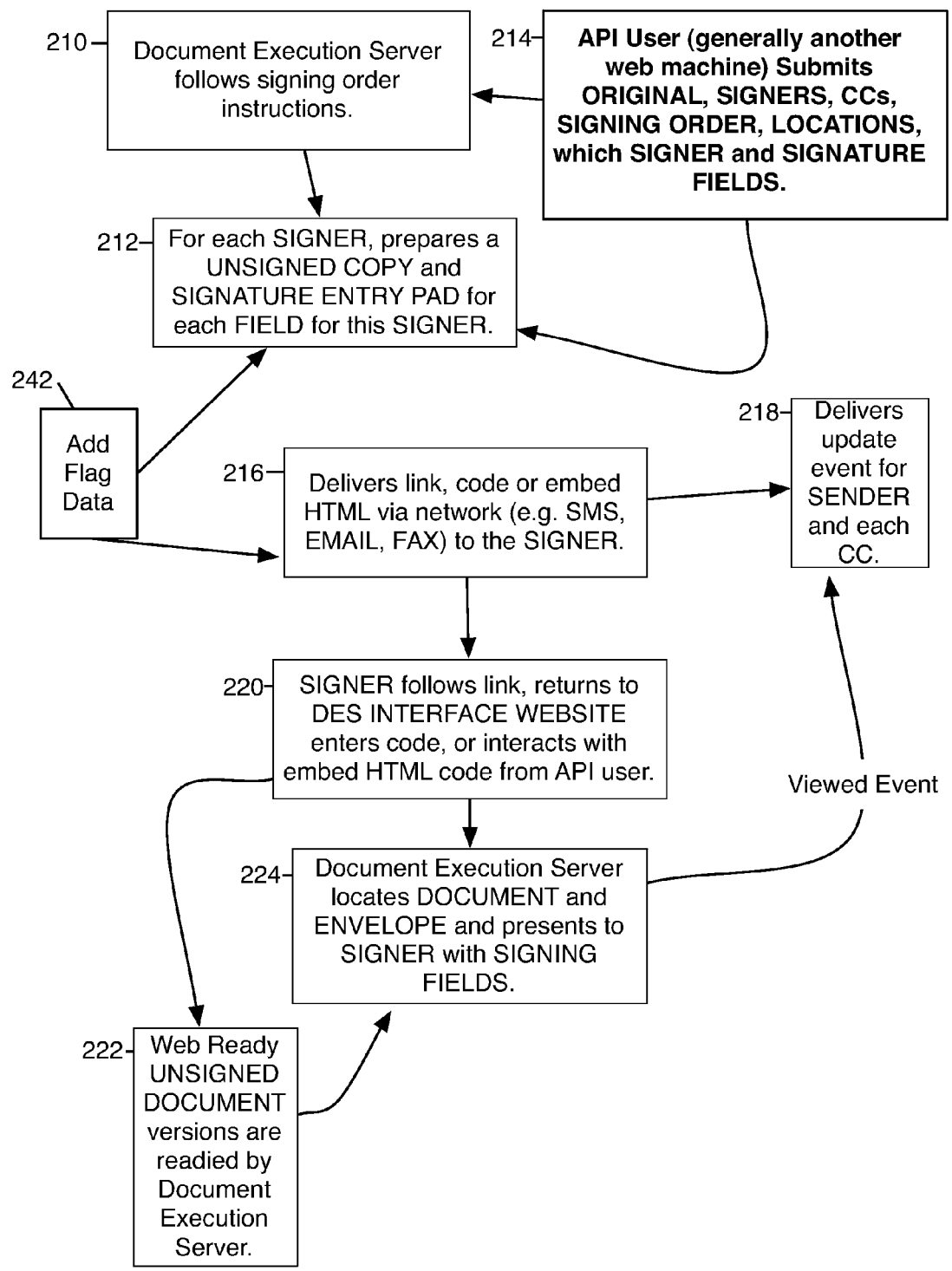
FIG. 7A is a flowchart of an embodiment of the present method.
Figure 7B:
FIG. 7B is a screenshot of an unsigned electronic document having a flag, as used in an embodiment of the present system and method.
Figure 8:
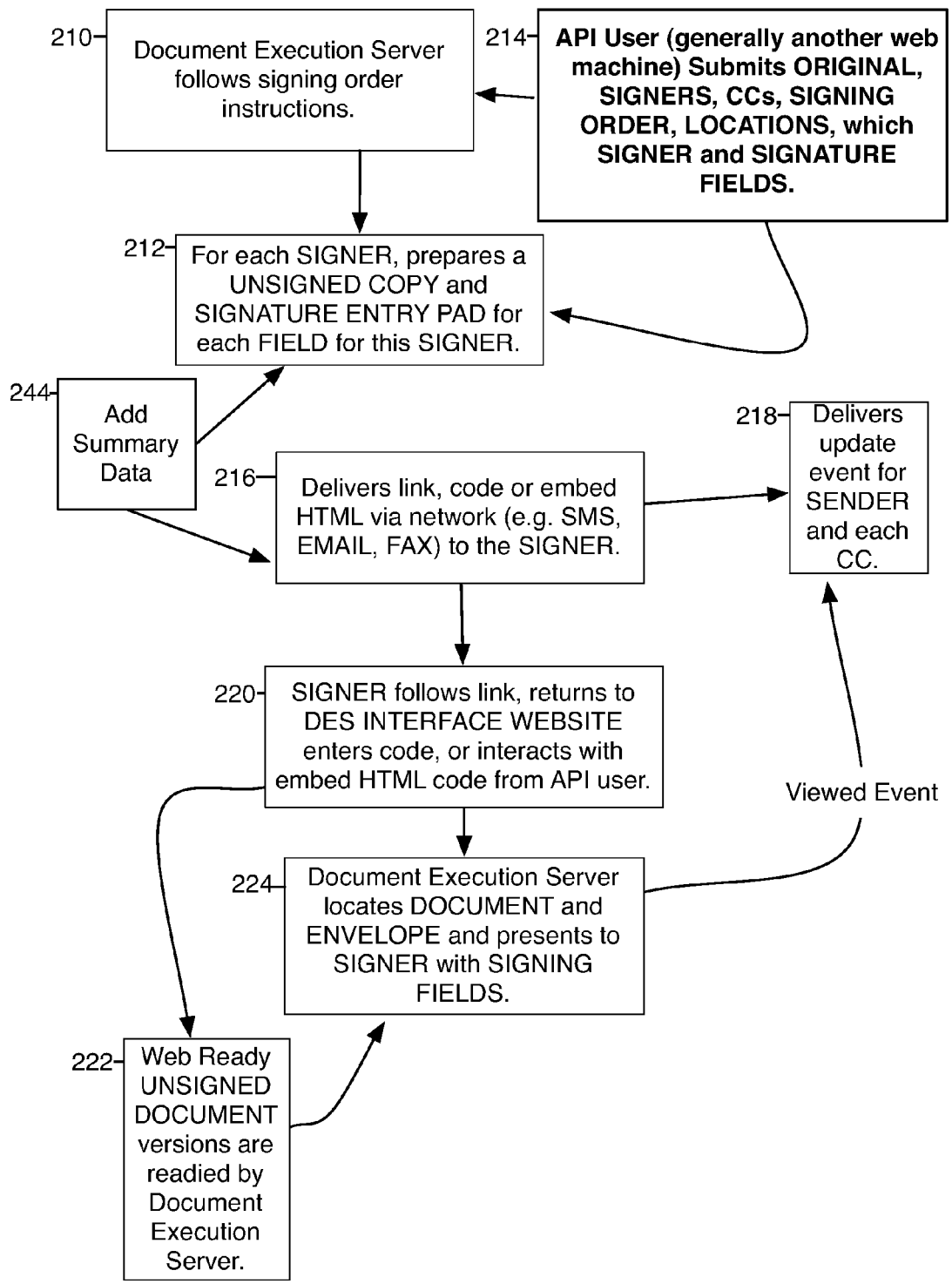
FIG. 8 is a flowchart of an embodiment of the present method.

In an alternative embodiment, as shown in FIG. 7A, the document execution server, prior to delivering 216 the unsigned electronic document to the signer user, modifies 242 the unsigned electronic document to include flag data to successively identify to each respective signer user the signature fields in that unsigned electronic document which required data entry. The flag data is associated with visual "flags" 126 is some visual insignia, such as a colored arrow, or any other indicator noticeable by the signer user and generally recognizable by signer users as a flag 126 that requires attention, as shown in FIG. 7B. The flags 126 may be static within the unsigned document, i.e., one flag is visually affixed adjacent each signature field. Alternatively, the flags 126 are dynamic, such that once a signature field is completed, the flag changes, for example, it disappears, changes colors, moves, and the like. This flag data typically is removed when the document execution server combines 230 the unsigned document and graphical representations of signature field data to create the signed electronic document.

In an alternative embodiment, as shown in FIG. 6, the document execution server, prior to or contemporaneous with delivering 216 the unsigned electronic document to the signer user, modifies 244 the unsigned electronic document to include summary data, represented by an information summary indicator 124, associated with the document to assist signer users identify the locations of signature fields in the electronic document. Such information summary indicator 124 is presented in a side menu to the document, appears visually on the same page as a signature field, or is presented anywhere on the visual periphery of document pages. The information summary indicator includes such indicators as the total number of signature fields in the subject document, the number of signature fields that have been completed, the number of signature fields remaining to be completed, or any combination of such data. Alternatively, the information summary indicator 124 is presented graphically as a bar, as buttons, as text, as color indicators (e.g., red for incomplete signature fields; green for completed signature fields), and the like. In an embodiment, the information summary indicator 124 is static, by presenting location identification data (e.g., page, paragraph information) associated with each signature field, or by presenting the total number of signature fields contained in the subject document. Alternatively, the information summary indicator 124 is dynamic, changing as the signer user completes each signature field.

Figure 9A:
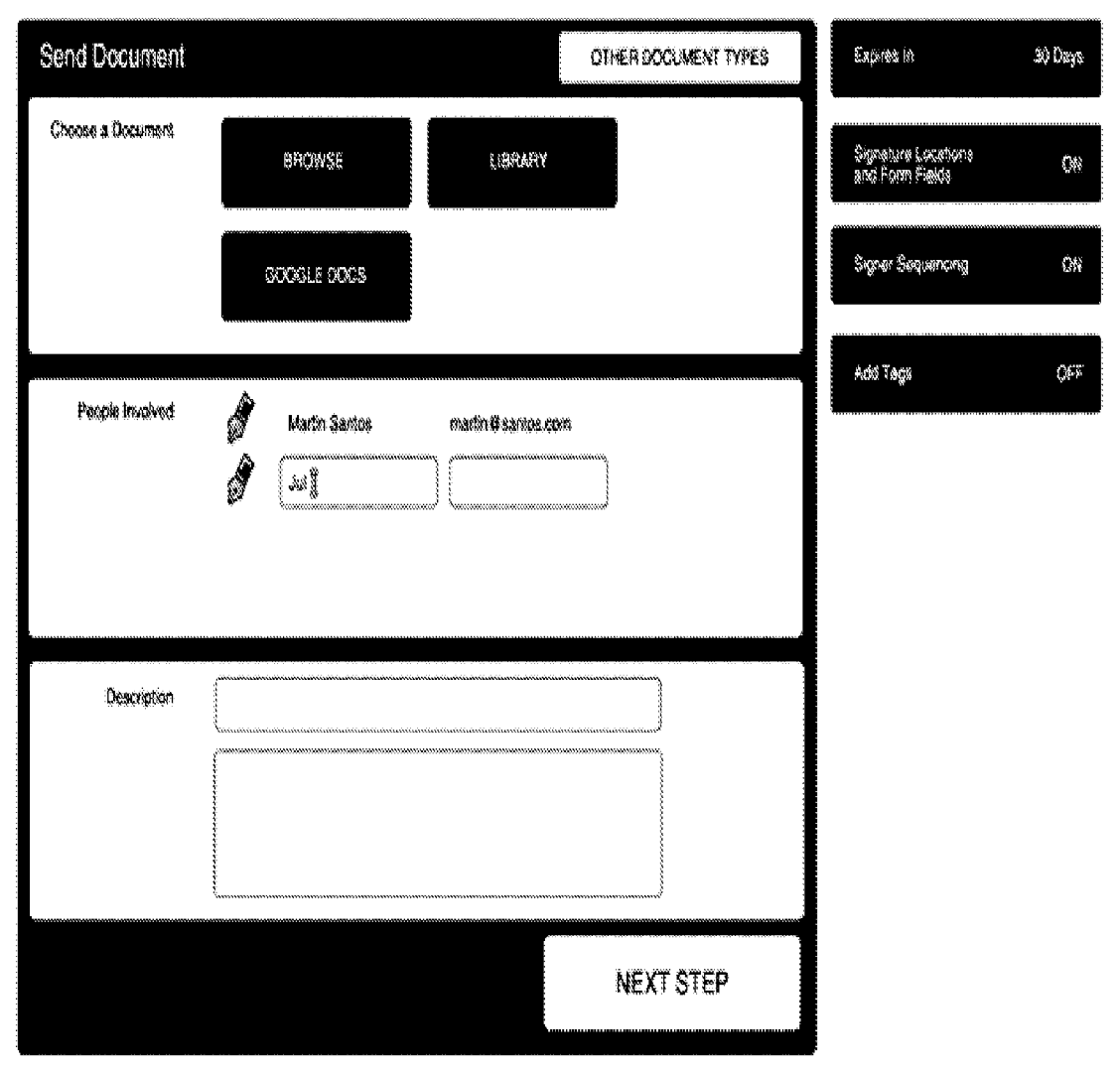
Figure 9B:
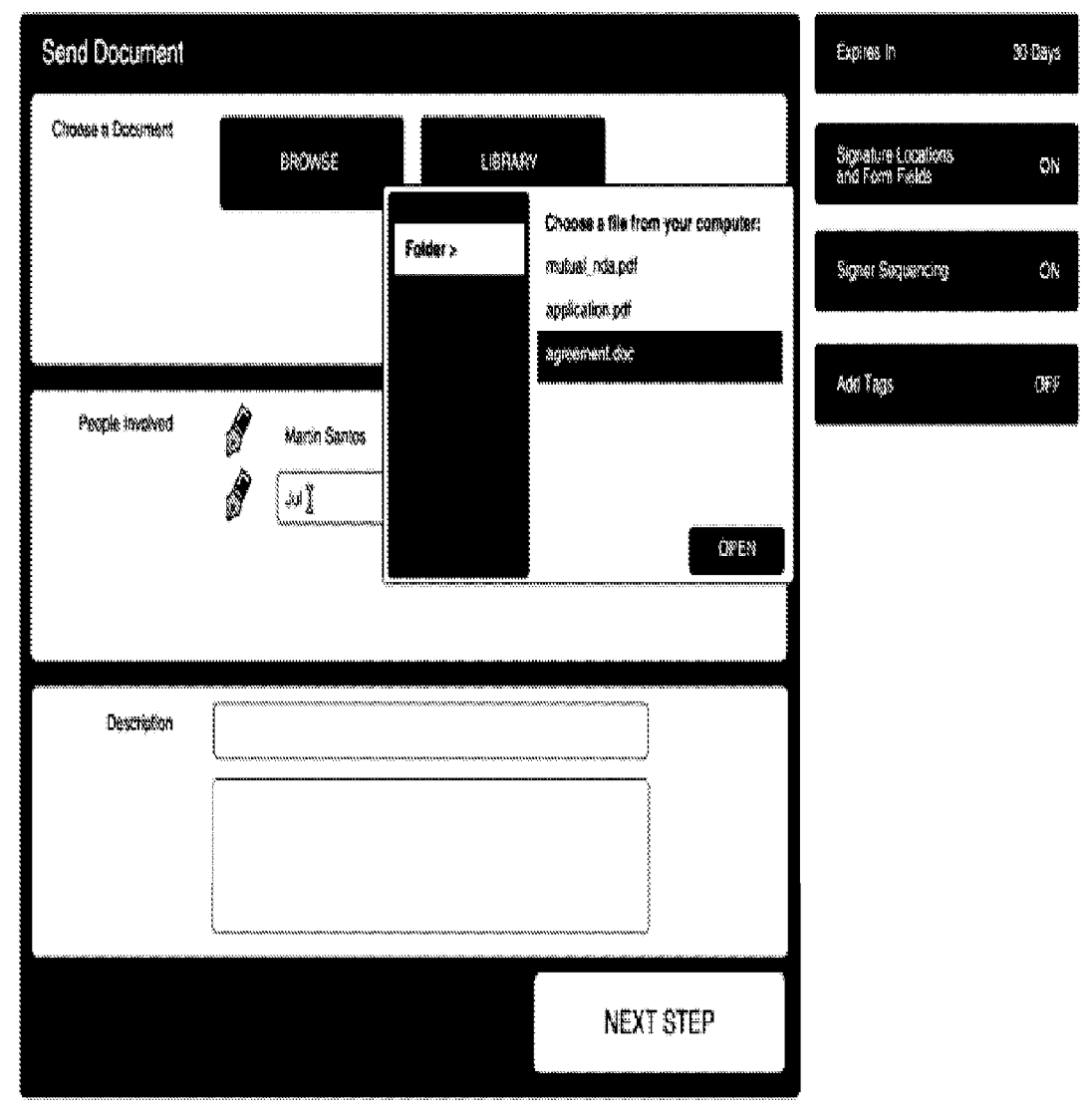
Figure 9C:
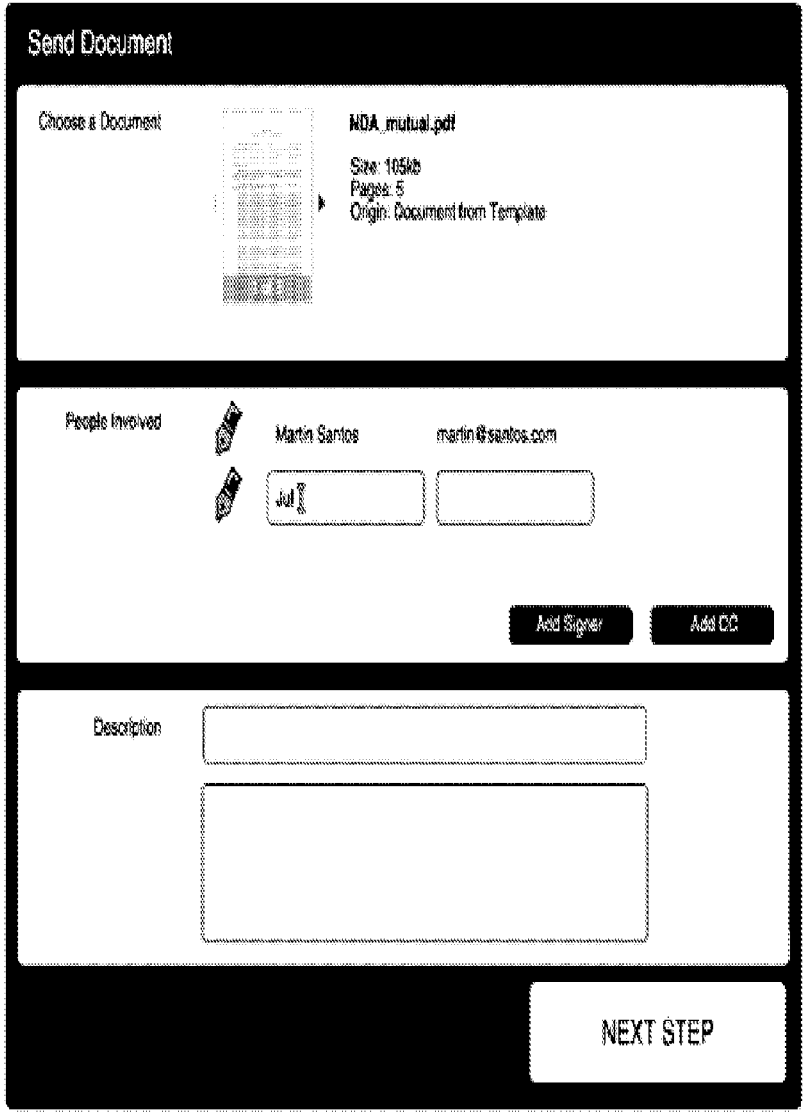

Turning now to FIGS. 9A-9M, this series of screen shots shows an exemplary embodiment of the present system and method. FIG. 9A shows a start-up/home screen for a website using the present system and method. Note that the sender user is prompted to "Choose a Document", name the "People Involved", (aka signer users), and enter a document "Description." In FIG. 9B, the sender user viewing this screen selects a "NDA" document from a selection of available template documents. The document sender may also import a self-generated document, or select a document from another source, as available.

FIG. 9C shows that a signer user has been selected, "Jonathan Siegel", having an associated email address. The document sender may select from a library of contacts stored in association with the document sender's account information at the website, may manually enter the signer user contact information, or may otherwise import the information from a source. Note that to the right of the screen, the document sender has the option of associating an expiration date with the selected document. This expiration date is that date on which a signer user no longer can complete the signature fields of a received unsigned document. In addition, to the right of the screen is a counter indicating the number of signature locations and form fields that occur in the subject document. It also allows the document sender to include flags, or "tags" in the subject document.

Figure 9D:
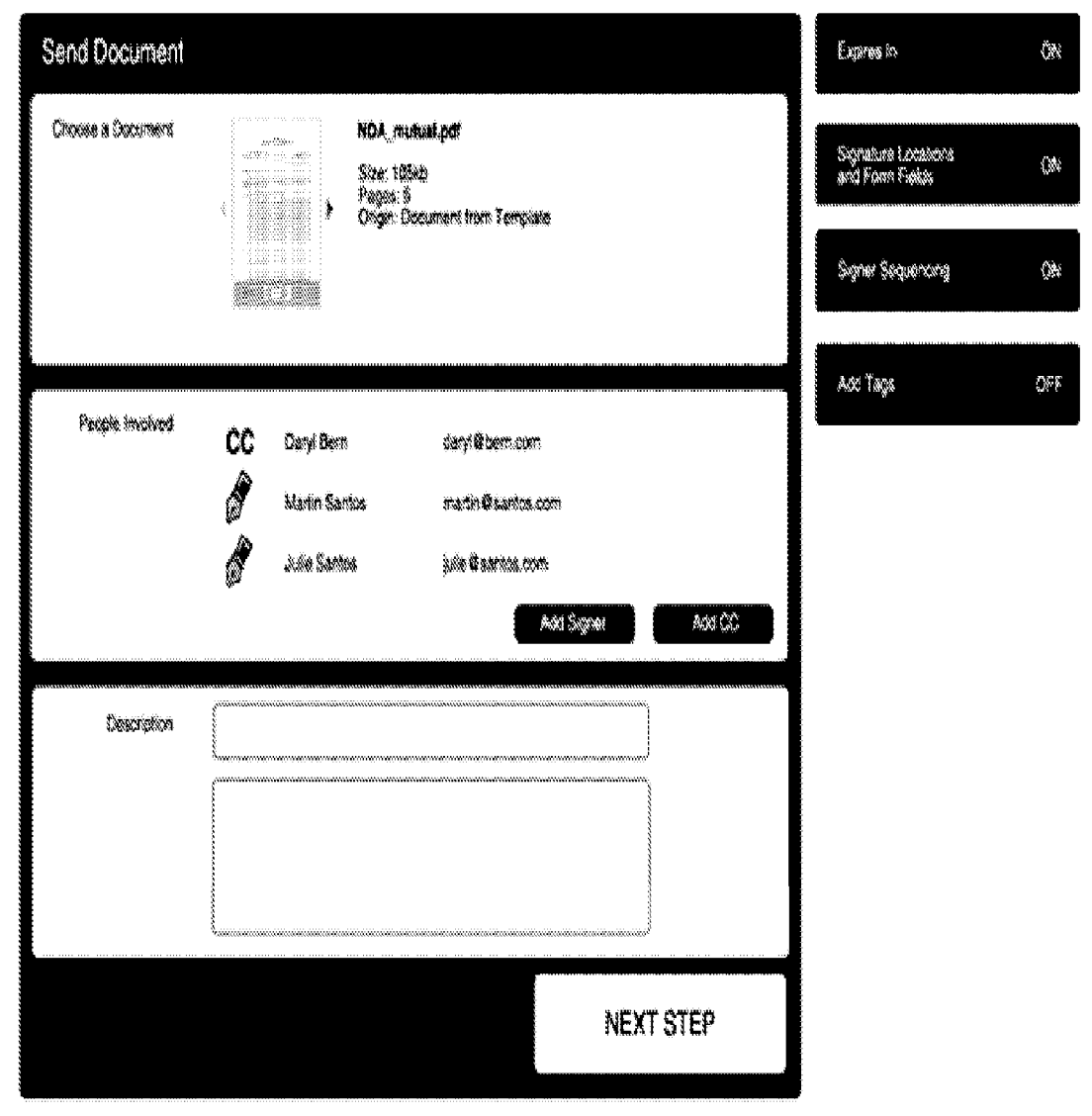
Figure 9E:
Figure 9F:
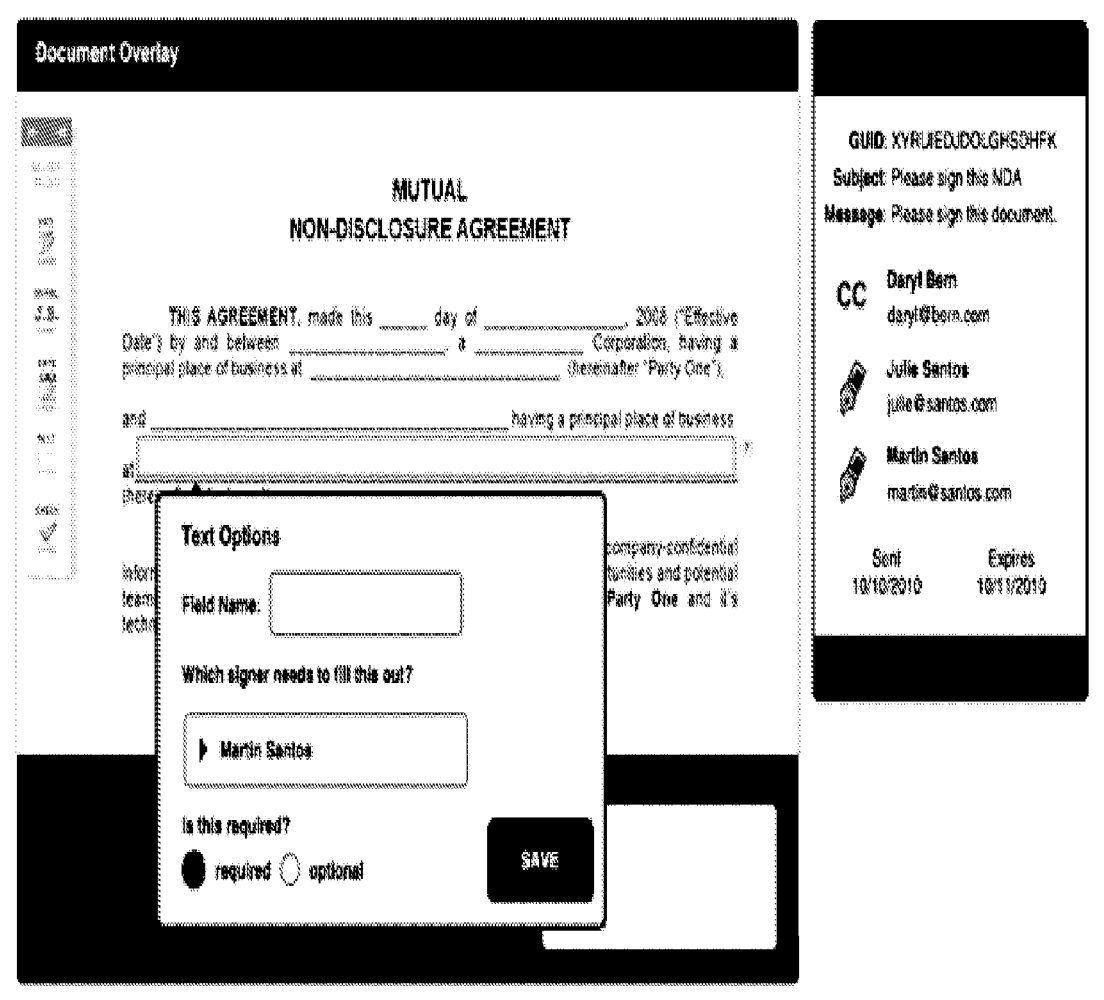
Figure 9G:
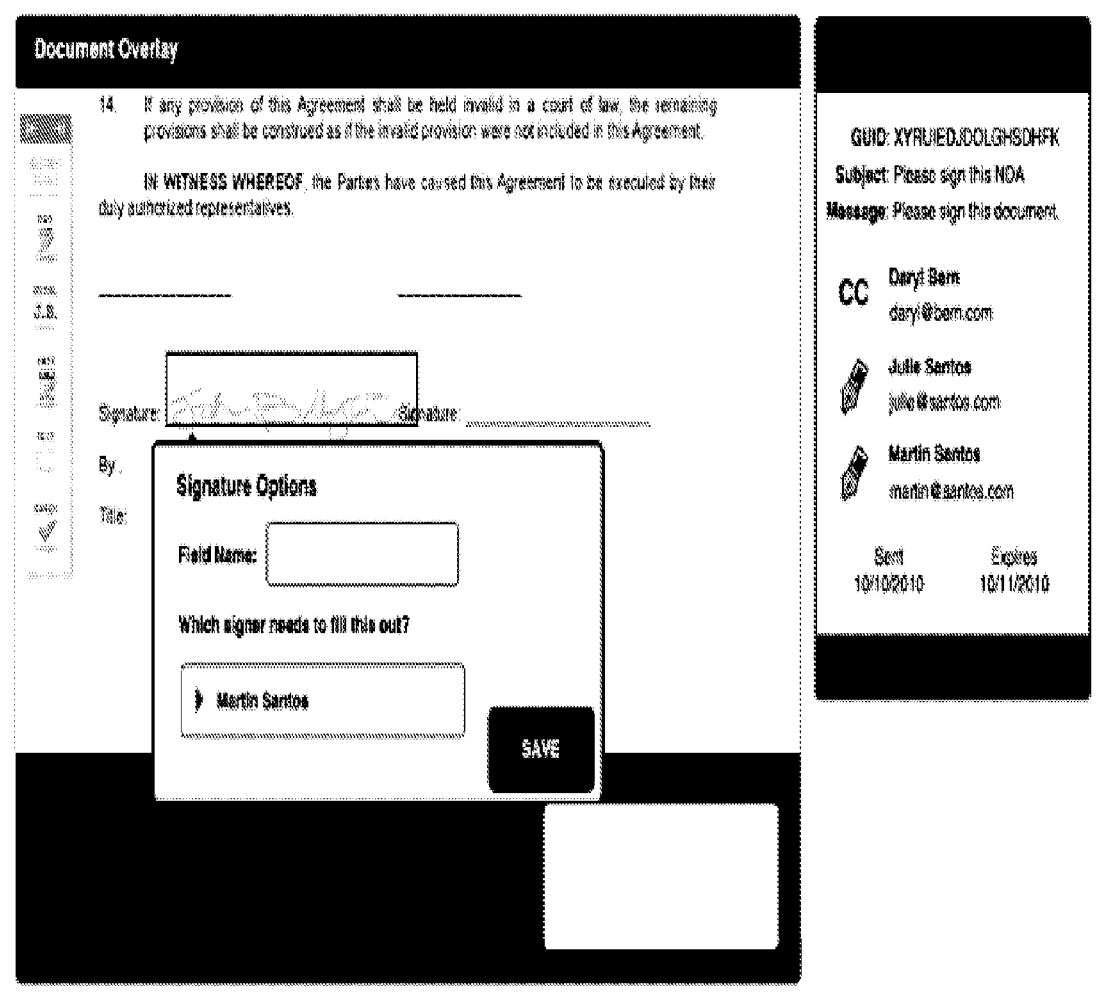

FIG. 9D shows a screen in which the document sender selected two signer users ("Jonathan Siegel" and "Jeff Siegel"), and also selected a non-signer user to receive a copy of the document, including the signed document ("cc" "Jones Siegel"). FIG. 9E shows a document sender selecting a signature entry pad as a document overlay to insert in a signature field in the electronic document. FIG. 9F shows the screen that allows the document sender to identify which signer user is associated with which signature field. The screen allows the document sender to indicate whether a signature is required or optional, and associates a name with a given signature field for easily inserting the signature field in multiple locations in the document. FIG. 9G shows the signature entry pad associated with the signature field identified in the previous screen, located at the desired location within the document.

Figure 9H:

FIG. 9H shows a screen having a flag to the left of a signature field to be completed by a designated signer user, and summary text appearing at the top of the screen, indicating the number of signature fields to be completed in the document. At this point, the screen still is being viewed by the document sender as the unsigned electronic document is being generated. The above steps are repeated iteratively until all desired signature fields and associated signature entry pads are defined and placed throughout the document.

Figure 9I:
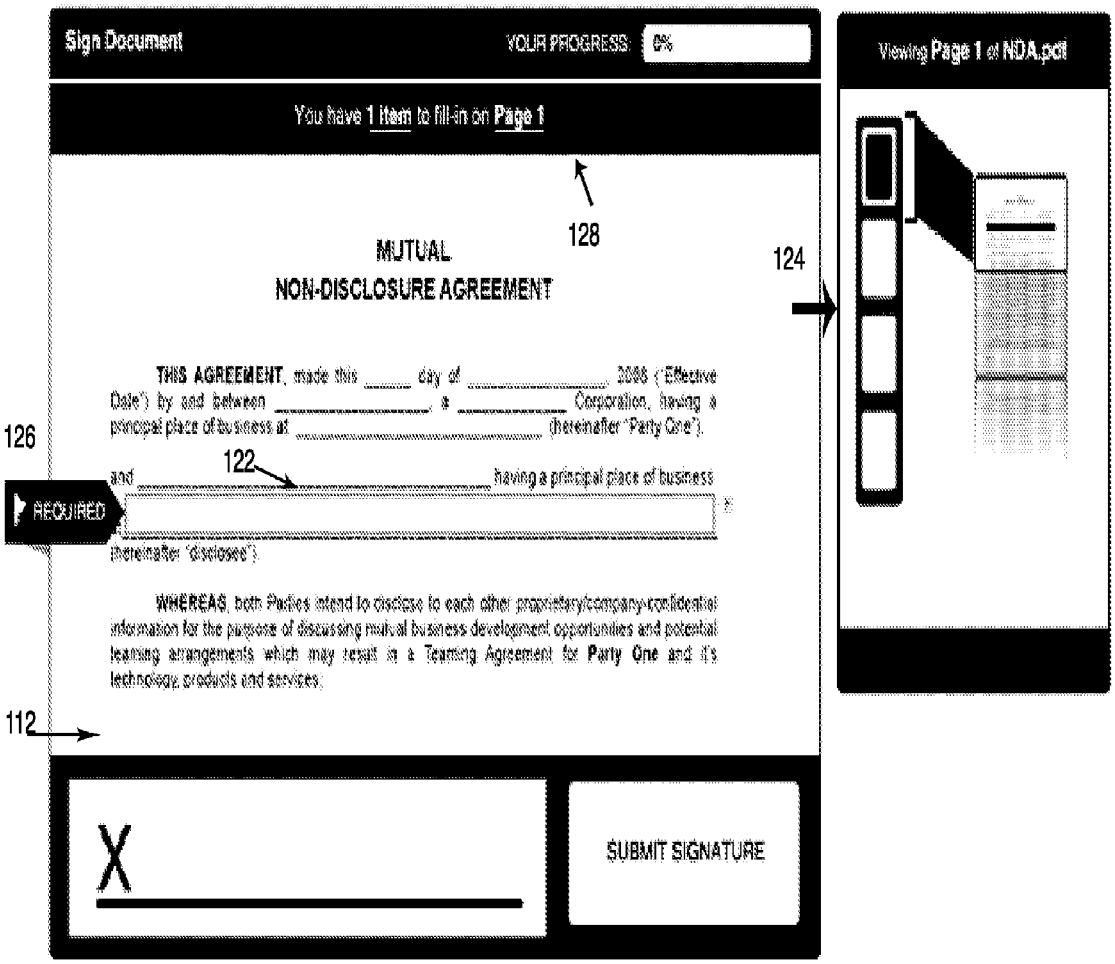

FIG. 9I shows a visual summary data indicator 124 that indicates certain information to the screen viewer about the subject unsigned electronic document 112 presented to a signer user. The visual may be in the form of a "thermometer-type" bar indicator (as shown), or any other visual quantitative indicator. The document summary server 108 collects information from each of the signer users regarding an unsigned electronic document. The collated information from the signer users is displayed on the information summary indicator 124 to indicate the level of completion of the signature fields within the target document. Note that at the top of the screen display for the document, are text instructions 128. These text instructions may function as an information summary indicator 124, as shown in FIG. 9I, or may be text instructions on what actions are required by the signer user, as shown in FIG. 9J.

Figure 9J:
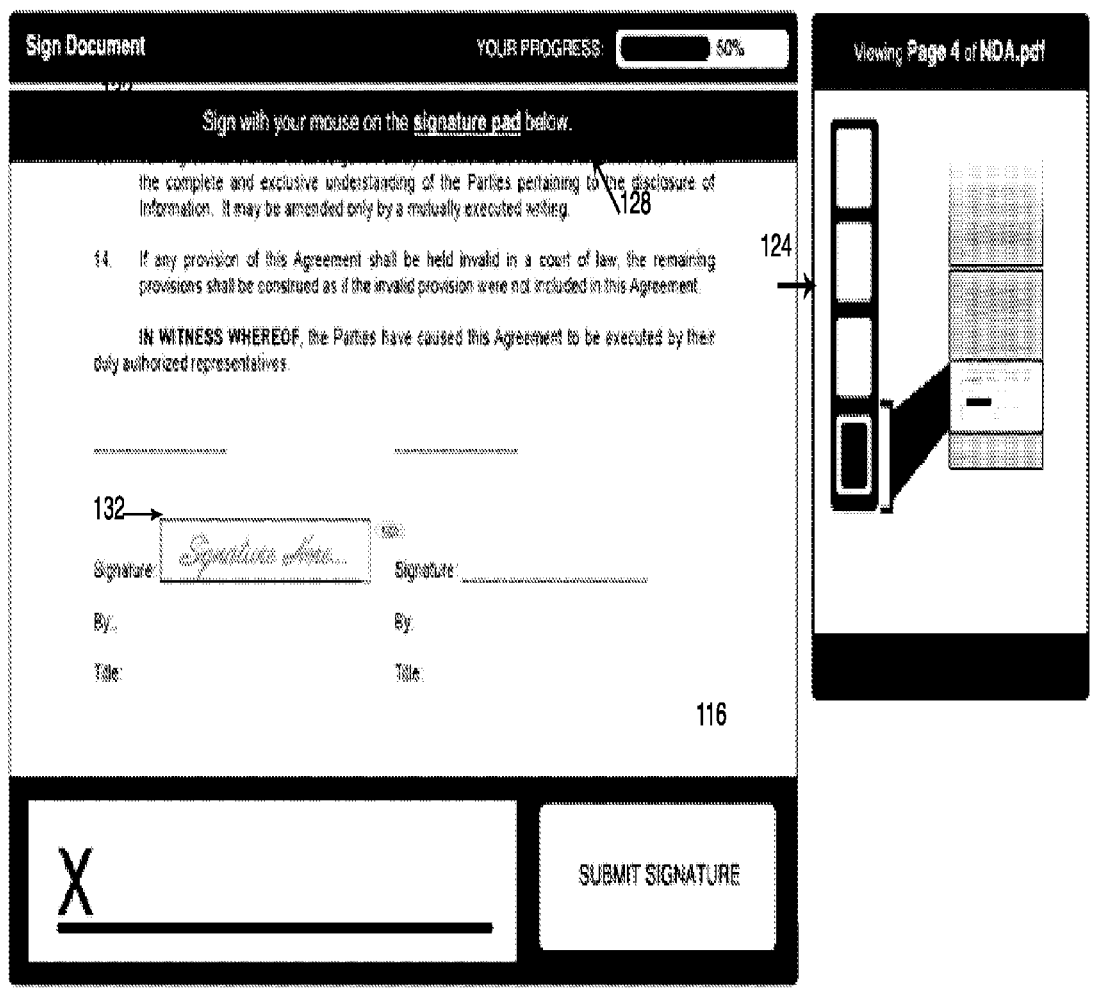

FIG. 9J shows how the signature field and associated signature entry pad appears to the signer user once the scaffold document is completed and sent to the signer user. Note that the information summary indicator 124 changes to reflect that there remains one incomplete signature field in the document. In a color version of this embodiment, pages having incomplete signature fields may appear in one color, such as red, whereas pages on which all signature fields are complete may appear in another color, such as blue. The information summary indicator 124 may include both a dynamic element, as in the illustrated embodiment, wherein an indicator "slides" from the top to the bottom of a bar to indicate level of completion, and/or a color element.

Figure 9K:
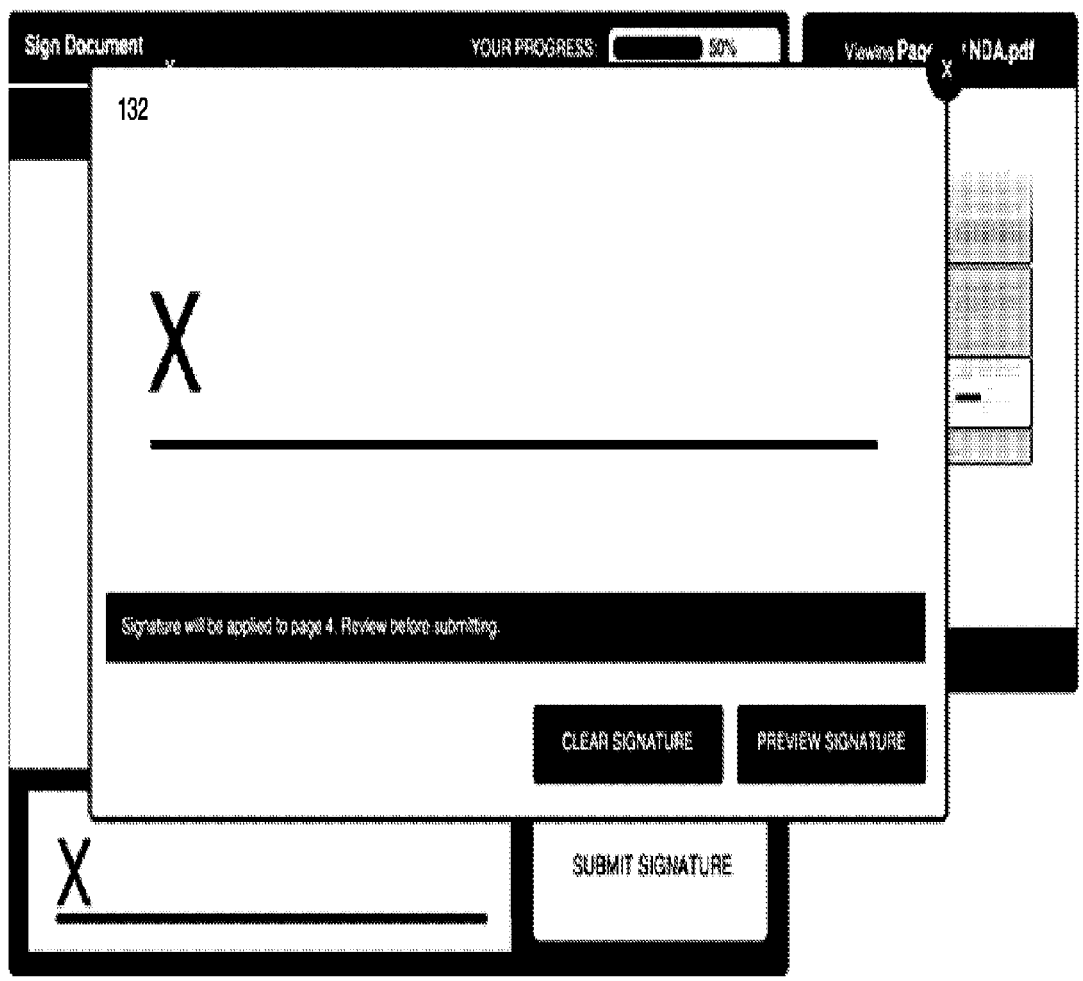
Figure 9L:
Figure 9M:
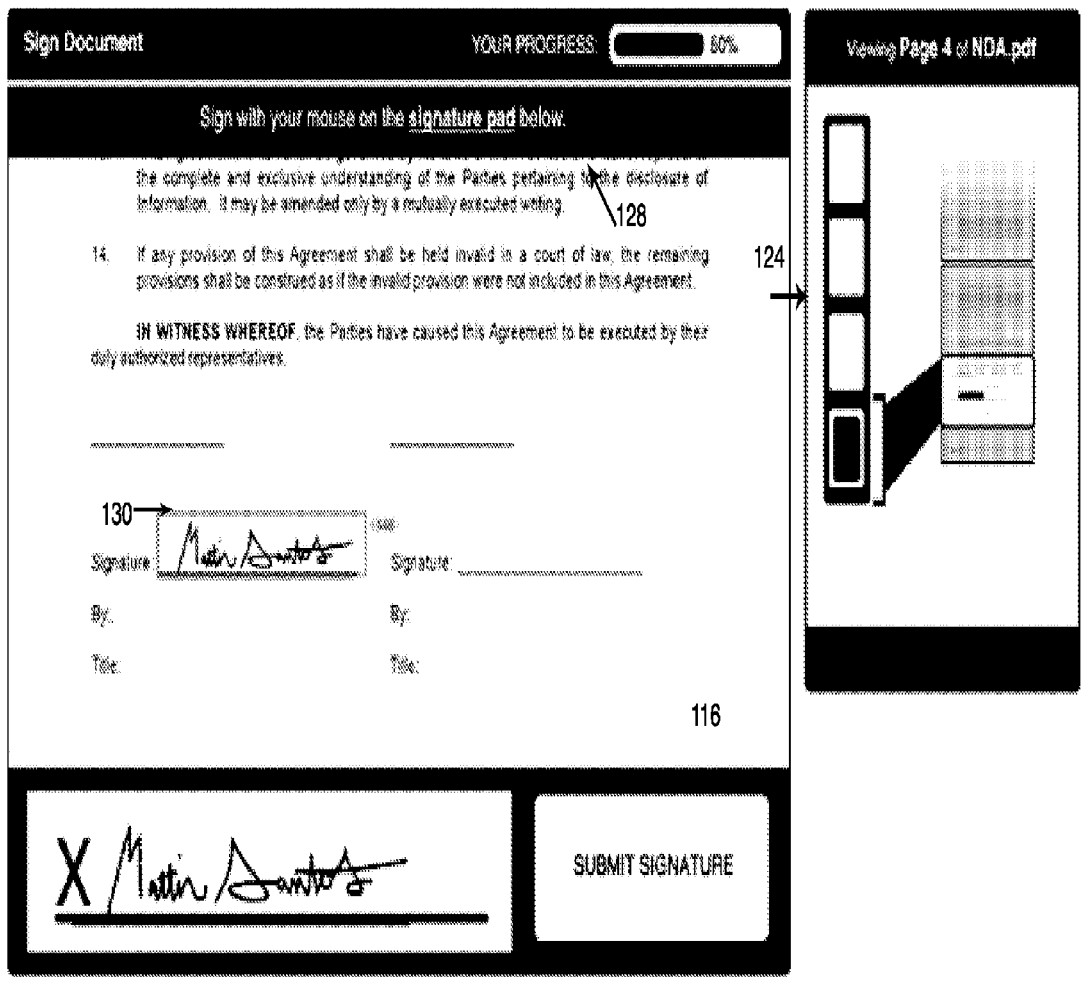

FIG. 9K is a close-up view of the signature field and associated signature entry pad, as shown in FIG. 9J. FIG. 9L shows the same signature field with a freehand signature included from a signer user. FIG. 9M shows a document with a signature in the signature field, prior to the signed document being submitted to the document execution server.

Although these screen shots show one implementation of the present method and system, there are many variations on the specific systems used, software programs and languages used, and layout and design used in implementing the present method and system within the scope of the claims.

The present method and system can be practiced in a number of variations, including variations on workflow. In an embodiment, some information entry fields 122 are identified as being required to be completed, whereas other fields 122 are optional. In an embodiment, the workflow order is adjusted in accordance with the type of document to be completed, the number and nature of the signer users 120 involved, and other variations based on the preferences set by the document sender 110. In one such embodiment, the document sender 110 is a set workflow order requiring one signer user 120 to complete one or more information entry fields 118 before certain other identified signer users. The document summary server 108 may include workflow order restrictions for an unsigned electronic document 112 requiring iterative, serial actions. For example, a document sender 110 may instruct that signer user 1 $U_1$ complete information entry field 1 $F_{1,1}$, followed by the completion by signer user 2 $U_2$ of information entry field 2 $F_{2,1}$, before signer user 1 $U_1$ completes information entry field 2 $F_{1,2}$, and so forth until all information entry fields are complete.

In a more simplified embodiment, the document summary server assigns a workflow order that requires a first signer user $U_1$ complete all information entry fields F prior to the document being sent to another signer user $U_i$. In another embodiment, the document summary server 108 requires that each signer user complete the information entry fields in a predetermined order; for example, for signer user 1, $U_1$, $F_{1,1}$, THEN $F_{1,2}$, and the like.

Alternative embodiments include various forms of exclusivity. For example, information entry fields may be shared by one or more signer user, such that either signer user may complete one or more designated information entry fields. This may be done on a per-field basis, or for all fields in an entire document. In another embodiment, information entry fields are shared by one or more signer users, such that each signer user individually completes a designated information entry field, and the information provided by each such signer user is concatenated to complete a single information entry field.

Alternative embodiments of the present system and method include variations on graphical updating of the summary data, represented by an information summary indicator 124. In another embodiment, upon receipt of the $F_{i,j}$ data, the graphical representation of the information summary indicator 124 is updated immediately to the user $U_i$. In another embodiment, upon receipt of the $F_{i,j}$ data, the graphical representation of the information summary indicator 124 is NOT updated immediately to the user $U_i$. In another embodiment, upon receipt of the $F_{i,j}$ data, the graphical representation of the information summary indicator 124 is updated immediately for future users, i.e., $U_{i+1}$.

In alternative embodiments of the present system and method, some $F_{i,j}$ may have default values that cannot be modified by a sender user, for example, "Date" information entry fields may automatically fill with the current date. In an alternative embodiment, some information entry fields have default values that can be modified by all or certain identified signer users. Alternatively, some information entry fields may be filled using a merge function, with data selected by the user signer. In another embodiment, some multiple $F_{i,j}$ are completed by information input only one time by the signer user; for example, a single signature event then is automatically input simultaneously into potentially many $F_{i,j}$ identified either by a signer user, or the document sender.

Further alternative embodiments include displaying to each signer user 120 different types and amounts of information relating to a scaffold document 118. For example, the screen display of an unsigned electronic document 112 may include the total number information entry fields $|F_{i,j}|$ and the number of complete information entry fields $|C_{i,j}|$, but not the total number of incomplete information entry fields for a specified document. Alternatively, the screen display of an unsigned electronic document 112 includes the total number information entry fields $|F_{i,j}|$ and the number of incomplete information entry fields $|I_{i,j}|$, but not the total number of complete information entry fields $|C_{i,j}|$ for a specified document.

In another alternative embodiment, the screen displays the page numbers on which the next incomplete information entry field $I_{i,j}$ appears.

In an alternative embodiment, the display for a display screen on which the scaffold document 118 or the unsigned electronic document 112 appear includes a conventional moveable window that is slidable over the display of the unsigned electronic document to makes available for viewing only that portion of the document underlying the region of the window. An alternative of such an embodiment includes an actionable link $|L_{i,j}|$ is displayed to bring the next information entry field to the viewport. Alternatively, an actionable link $|L_{i,j}|$ is displayed for the incomplete required information entry fields $|I_{i,j}|$. Alternatively, a visual indicator of the next incomplete required information entry fields $Z_{i,j}$ is displayed for incomplete required information entry fields $|I_{i,j}|$. In yet another alternative, the visual indicator of the next incomplete required information entry field $Z_{i,j}$ is displayed for $|I_{i,j}|$ and includes an actionable link to bring the target information entry field into the viewport; for example, the visual indicator is an arrow on one side of the display screen, which arrow is clickable.

In addition, an alternative embodiment includes various ways of displaying to one or more signer user what information is entered by one or more of the other signer users. For example, the information summary indicator may display to one signer user which information entry fields are completed by the other signer user, and which remain incomplete. In this embodiment, for example, the completed information entry field by one user $C_{1,1}$ appears as a green box on the unsigned electronic document displayed to a second signer user, whereas an incomplete information entry field by one user $I_{i,j}$ is displayed as a red box on the unsigned electronic document displayed to the second user.

The various methods described above may be embodied in, and fully automated by, software code modules executed by one or more general purpose computers. The code modules may be stored in any type of computer storage device or devices (hard disk storage, solid state RAM, and the like). The steps may be implemented using any type of computer storage device or devices, and using any type or types of data repositories (relational databases, flat files, caches, and the like) to store any data.

As will be appreciated, various combinations of the features and methods described herein may be incorporated into a given system according to the invention. Accordingly, all combinations of the disclosed features and methods fall within the scope of this disclosure.

Although this invention has been described in terms of certain embodiments, other embodiments that are apparent to those of ordinary skill in the art, including embodiments which do not provide all of the benefits and features set forth herein, are also within the scope of this invention. Accordingly, the scope of the present invention is defined only by reference to the appended claims.

What we claim is:

1. Method for facilitating the entry by a plurality of users, of information into a scaffold electronic document, wherein the scaffold electronic document includes content displayable to the plurality of users as text and/or graphics on one or more pages, and m groups of information entry fields $U_1, \ldots, U_i, \ldots, U_m$, each group being associated with a distinct user of the plurality of users, and wherein the $i^{th}$ group of information entry fields includes $n_i$, information entry fields $F_{i1}, \ldots, F_{iji}, \ldots, F_{ini}$, wherein the information entry fields are adapted to receive information entered therein by an $i^{th}$ user, comprising the steps of:

by a document summary server,

A. for the scaffold electronic document, establishing a group index i for each of the m groups of information entry fields where $1 \leq i \leq m$, and establishing a subgroup index $j_i$ for the $i^{th}$ group of information entry fields $F_{iji}$ of the respective m groups where $1 \leq i \leq m$ and where $1 \leq j_i \leq n_i$, wherein i and $j_i$ for the $i^{th}$ user have initial values equal to 1 for the scaffold electronic document, and i and $j_i$ have maximum values equal to m and $n_i$ respectively for the scaffold electronic document, B. displaying to each $i^{th}$ user of the plurality of users, over a network, a respective unsigned copy of the scaffold electronic document, such that a different unsigned copy of the scaffold electronic document is displayed to each of the plurality of users, C. in response to receipt over the network of data indicative of entry by each $i^{th}$ user of information into the $j_i^{th}$ information entry field of the $i^{th}$ group, modifying the respective unsigned copy of the scaffold electronic document for that $i^{th}$ user to include the entered information in the $j_i^{th}$ information entry field, and incrementing the subgroup index j for the $F_{iji}^{th}$ subgroup, D. enabling display to each $i^{th}$ user, a steps-to-go display representative of the difference between the maximum value of the subgroup index $j_i$ for that $i^{th}$ user and the current value of the subgroup index $j_i$ for that $i^{th}$ user, E. generating a signed document for each $i^{th}$ user by (i) creating a graphical representation based on data indicative of entry by that $i^{th}$ user and (ii) combining the graphical representation with the respective unsigned copy of the scaffold electronic document, and F. combining the graphical representations created across all of the plurality of users into a single signed document.

2. The method according to claim 1, wherein the steps-to-go display is made available for display to each $i^{th}$ user in the form of a gauge showing the initial value of index $j_i$ (=1) for the $i^{th}$ user, the maximum value of the index $j_i$ (=$n_i$) for the $i^{th}$ user and the current value of the index $j_i$ (=$j_i$) for the $i^{th}$ user.

3. The method according to claim 1, comprising the further step of making available for display in relation to the $i^{th}$ user, a next-field display representative of the location in the scaffold electronic document of the next information entry field in the $i^{th}$ group in the scaffold electronic document having no user-entered data.

4. The method of claim 1, further comprising enabling for display to the $i^{th}$ user, a progress display representative of the current value of the subgroup index $j_i$ for the $i^{th}$ user.

5. The method of claim 1, further comprising enabling for display in relation to the $i^{th}$ user, a scope display representative of the maximum value of the subgroup index $j_i$ for the $i^{th}$ user.

6. The method of claim 1, wherein displaying, to each $i^{th}$ user, the respective unsigned copy of the scaffold electronic document includes, for each $i^{th}$ user:
preparing an envelope for the $i^{th}$ user, the envelope including an unsigned copy of the scaffold electronic document and a signature entry pad for each field to be completed by the $i^{th}$ user, each signature entry pad providing a dynamic field to facilitate entry of information;
delivering a link to the $i^{th}$ user, the link enabling the $i^{th}$ user to access the envelope for the $i^{th}$ user; and
in response to receiving a request from the $i^{th}$ user generated by the $i^{th}$ user following the delivered link, locating the envelope for the $i^{th}$ user and presenting the $i^{th}$ user with the unsigned copy of the scaffold electronic document within the envelope for the $i^{th}$ user, the unsigned copy of the scaffold electronic document to be filled in using the respective signature entry pad for each field to be completed by the $i^{th}$ user.

7. The method of claim 1, further comprising:
receiving names and contact information of a set of non-users designated to receive copies of the signed document; and
when combining the graphical representation with the respective unsigned copy of the scaffold electronic document for each $i^{th}$ user, delivering a progress update to each of the set of non-users, such that each of the set of non-users is caused to receive a respective progress update for each of the plurality of users.

8. A document summary server for facilitating the entry by a plurality of users, of information into a scaffold electronic document, wherein the scaffold electronic document includes content displayable to the plurality of users as text and/or graphics on one or more pages, and m groups of information entry fields $U_1, \ldots, U_i, \ldots, U_m$, each group being associated with a distinct user of the plurality of users, and wherein the $i^{th}$ group of information entry fields includes $n_i$, information entry fields $F_{i1}, \ldots, F_{iji}, \ldots, F_{ini}$, wherein the information entry fields are adapted to receive information entered therein by an $i^{th}$ user, the document summary server implemented on a computer system constructed and arranged to:
A. for the scaffold electronic document, establish a group index i for each of the m groups of information entry fields where $1 \leq i \leq m$, and establishing a subgroup index $j_i$ for the $i^{th}$ group of information entry fields $F_{iji}$ of the respective m groups where $1 \leq i \leq m$ and where $1 \leq j_i \leq n_i$, wherein i and $j_i$ for the $i^{th}$ user have initial values equal to 1 for the scaffold electronic document, and i and $j_i$ have maximum values equal to m and $n_i$ respectively for the scaffold electronic document,
B. display to each $i^{th}$ user of the plurality of users, over a network, a respective unsigned copy of the scaffold electronic document, such that a different unsigned copy of the scaffold electronic document is displayed to each of the plurality of users,
C. generate a signed document for each $i^{th}$ user by (i) creating a graphical representation based on data indicative of entry by that $i^{th}$ user and (ii) combining the graphical representation with the respective unsigned copy of the scaffold electronic document, and
D. combine the graphical representations created across all of the plurality of users into a single signed document.

9. The document summary server of claim 8, wherein, when constructed and arranged to display, to each $i^{th}$ user, the respective unsigned copy of the scaffold electronic document, the computer system is further constructed and arranged to, for each $i^{th}$ user:
prepare an envelope for the $i^{th}$ user, the envelope including an unsigned copy of the scaffold electronic document and a signature entry pad for each field to be completed by the $i^{th}$ user, each signature entry pad providing a dynamic field to facilitate entry of information;
deliver a link to the $i^{th}$ user, the link enabling the $i^{th}$ user to access the envelope for the $i^{th}$ user; and
in response to receipt of a request from the $i^{th}$ user generated by the $i^{th}$ user following the delivered link, locate the envelope for the $i^{th}$ user and present the $i^{th}$ user with the unsigned copy of the scaffold electronic document within the envelope for the $i^{th}$ user, the unsigned copy of the scaffold electronic document to be filled in using the respective signature entry pad for each field to be completed by the $i^{th}$ user.

10. The method of claim 8, wherein the computer system is further constructed and arranged to:
receive names and contact information of a set of non-users designated to receive copies of the signed document; and
when combining the graphical representation with the unsigned copy of the scaffold electronic document for each $i^{th}$ user, deliver a progress update to each of the set of non-users, such that each of the set of non-users is caused to receive a respective progress update for each of the plurality of users.

11. A computer program product including a set of non-transitory, computer-readable media having instructions which, when executed by a set of processors, cause the set of processors to perform a method for facilitating the entry, by a plurality of users, of information into a scaffold electronic document, wherein the scaffold electronic document includes content displayable to the plurality of users as text and/or graphics on one or more pages, and m groups of information entry fields $U_1, \ldots, U_i, \ldots, U_m$, each group being associated with a distinct user of the plurality of users, and wherein the $i^{th}$ group of information entry fields includes $n_i$, information entry fields $F_{i1}, \ldots, F_{iji}, \ldots, F_{ini}$, wherein the information entry fields are adapted to receive information entered therein by an $i^{th}$ user, wherein the method comprises:
A. for the scaffold electronic document, establishing a group index i for each of the m groups of information entry fields where $1 \leq i \leq m$, and establishing a subgroup index $j_i$ for the $i^{th}$ group of information entry fields $F_{iji}$ of the respective m groups where $1 \leq i \leq m$ and where $1 \leq j_i \leq n_i$, wherein i and $j_i$ for the $i^{th}$ user have initial values equal to 1 for the scaffold electronic document, and i and $j_i$ have maximum values equal to m and $n_i$ respectively for the scaffold electronic document,
B. displaying to each $i^{th}$ user of the plurality of users, over a network, a respective unsigned copy of the scaffold electronic document, such that a different unsigned copy of the scaffold electronic document is displayed to each of the plurality of users,
C. generating a signed document for each $i^{th}$ user by (i) creating a graphical representation based on data indicative of entry by that $i^{th}$ user and (ii) combining the graphical representation with the respective unsigned copy of the scaffold electronic document, and
D. combining the graphical representations created across all of the plurality of users into a single signed document.

12. The computer program product of claim 11, wherein in response to receiving over the network of data indicative of entry by each $i^{th}$ user of information into the $j_i^{th}$ information entry field of the $i^{th}$ group, the method further comprises modifying the respective unsigned copy of the scaffold electronic document for that $i^{th}$ user to include the entered information in the $j_i^{th}$ information entry field, and incrementing the subgroup index j for the $F_{iji}^{th}$ subgroup.

13. The computer program product of claim 12, wherein the method further comprises enabling display to each $i^{th}$ user, a steps-to-go display representative of the difference between the maximum value of the subgroup index $j_i$ for that $i^{th}$ user and the current value of the subgroup index $j_i$ for that $i^{th}$ user.

14. The computer program product of claim 13, wherein the steps-to-go display is made available for display to each $i^{th}$ user in the form of a gauge showing the initial value of index $j_i$ (=1) for the $i^{th}$ user, the maximum value of the index $j_i$ (=$n_i$) for the $i^{th}$ user and the current value of the index $j_i$ (=$j_i$) for the $i^{th}$ user.

15. The computer program product of claim 11, the method comprising a further step of making available for display in relation to the $i^{th}$ user, a next-field display representative of the location in the scaffold electronic document of the next information entry field in the $i^{th}$ group in the scaffold electronic document having no user-entered data.

16. The computer program product of claim 11, wherein the method further comprises enabling for display to the $i^{th}$ user, a progress display representative of the current value of the subgroup index $j_i$ for the $i^{th}$ user.

17. The computer program product of claim 11, wherein the method further comprises enabling for display in relation to the $i^{th}$ user, a scope display representative of the maximum value of the subgroup index $j_i$ for the $i^{th}$ user.

18. The computer program product of claim 11, wherein displaying, to each $i^{th}$ user, the respective unsigned copy of the scaffold electronic document includes, for each $i^{th}$ user:
preparing an envelope for the $i^{th}$ user, the envelope including an unsigned copy of the scaffold electronic document and a signature entry pad for each field to be completed by the $i^{th}$ user, each signature entry pad providing a dynamic field to facilitate entry of information;
delivering a link to the $i^{th}$ user, the link enabling the $i^{th}$ user to access the envelope for the $i^{th}$ user; and
in response to receiving a request from the $i^{th}$ user generated by the $i^{th}$ user following the delivered link, locating the envelope for the $i^{th}$ user and presenting the $i^{th}$ user with the unsigned copy of the scaffold electronic document within the envelope for the $i^{th}$ user, the unsigned copy of the scaffold electronic document to be filled in using the respective signature entry pad for each field to be completed by the $i^{th}$ user.

19. The computer program product of claim 11, wherein the method further comprises:
receiving names and contact information of a set of non-users designated to receive copies of the signed document; and
when combining the graphical representation with the unsigned copy of the scaffold electronic document for each $i^{th}$ user, delivering a progress update to each of the set of non-users, such that each of the set of non-users is caused to receive a respective progress update for each of the plurality of users.

* * * * *